(12) United States Patent
Sekine et al.

(10) Patent No.: US 9,211,600 B2
(45) Date of Patent: Dec. 15, 2015

(54) BORON CARBIDE-CONTAINING CERAMIC BONDED BODY AND METHOD FOR PRODUCING THE BONDED BODY

(75) Inventors: Kiyoto Sekine, Aichi (JP); Takeshi Kumazawa, Aichi (JP); Hideki Kita, Aichi (JP); Hideki Hyuga, Aichi (JP)

(73) Assignee: MINO CERAMIC CO., LTD., Gifu (JP)

(*) Notice: Subject to any disclaimer, the term of this patent is extended or adjusted under 35 U.S.C. 154(b) by 352 days.

(21) Appl. No.: 13/819,651

(22) PCT Filed: Aug. 30, 2011

(86) PCT No.: PCT/JP2011/069670
§ 371 (c)(1),
(2), (4) Date: Feb. 27, 2013

(87) PCT Pub. No.: WO2012/029816
PCT Pub. Date: Mar. 8, 2012

(65) Prior Publication Data
US 2013/0157835 A1    Jun. 20, 2013

(30) Foreign Application Priority Data

Aug. 31, 2010 (JP) ................... 2010-193784
Nov. 11, 2010 (JP) ................... 2010-253236

(51) Int. Cl.
*C04B 35/563* (2006.01)
*C04B 37/00* (2006.01)
*B23K 1/19* (2006.01)

(52) U.S. Cl.
CPC ............... *B23K 1/19* (2013.01); *C04B 35/563* (2013.01); *C04B 37/005* (2013.01);
(Continued)

(58) Field of Classification Search
CPC ............... C04B 2237/064; C04B 2237/068; C04B 2237/121; C04B 2237/122; C04B 2237/124; C04B 2237/125; C04B 35/563; C04B 37/005; C04B 37/006; B23K 1/19
USPC ............... 75/230, 236, 238; 501/87; 228/121; 419/14
See application file for complete search history.

(56) References Cited

U.S. PATENT DOCUMENTS 3,730,827 A    5/1973    Matchen et al.
4,420,352 A *    12/1983    Schroeder et al. ......... 156/89.27
(Continued)

FOREIGN PATENT DOCUMENTS

JP    61-077676    4/1986
JP    62-128975    6/1987
(Continued)

OTHER PUBLICATIONS

English translation of JP 2001/261457; Sep. 2001.*
(Continued)

*Primary Examiner* — Helene Klemanski
(74) *Attorney, Agent, or Firm* — Hamre, Schumann, Mueller & Larson, P.C.

(57) ABSTRACT

A bonded, boron carbide-containing ceramic body includes ceramic members. These ceramic members each contain boron carbide at 2 mass % or higher, and are integrated together via a bonding layer bonded with a bonding material containing at least one metal selected from the group consisting of aluminum, copper, gold and zirconium or integrated together via a bonding layer formed from one of aluminum metal and an aluminum compound and a titanium compound as bonding materials, wherein a bonded part has a strength of 100 MPa or higher. According to this technology, the boron carbide-containing ceramic members can be bonded together with a high strength of 100 MPa or more by a simple process, and further, the bonding is feasible with excellent chemical resistance at the bonded part as needed.

14 Claims, 5 Drawing Sheets

(52) U.S. Cl.
CPC ........ C04B 37/006 (2013.01); *C04B 2237/064* (2013.01); *C04B 2237/068* (2013.01); *C04B 2237/121* (2013.01); *C04B 2237/122* (2013.01); *C04B 2237/124* (2013.01); *C04B 2237/125* (2013.01)

(56) References Cited

U.S. PATENT DOCUMENTS

| | | | |
|---|---|---|---|
| 4,824,008 A * | 4/1989 | Luszcz et al. | 228/121 |
| 4,836,084 A * | 6/1989 | Vogelesang | F41H 5/0414 |
| | | | 109/82 |
| 4,884,737 A * | 12/1989 | Newkirk et al. | 228/121 |
| 5,214,235 A | 5/1993 | Froeschner | |
| 5,429,879 A | 7/1995 | Syn et al. | |
| 5,451,279 A * | 9/1995 | Kohinata et al. | 228/121 |
| 5,866,245 A * | 2/1999 | Toriyama | C04B 35/593 |
| | | | 156/89.27 |
| 6,123,797 A * | 9/2000 | Pyzik et al. | 156/279 |
| 6,489,036 B1 * | 12/2002 | Sherman | 428/469 |
| 8,030,234 B2 * | 10/2011 | Pyzik et al. | 501/87 |
| 8,186,565 B1 * | 5/2012 | Pyzik et al. | 228/121 |
| 2005/0249602 A1 | 11/2005 | Freling et al. | |
| 2009/0229453 A1 | 9/2009 | Dickson | |
| 2009/0280708 A1 * | 11/2009 | Marissen | F41H 5/0428 |
| | | | 442/181 |
| 2009/0320676 A1 | 12/2009 | Cronin et al. | |
| 2010/0064404 A1 * | 3/2010 | Es Van | F41H 5/0485 |
| | | | 2/2.5 |
| 2010/0327537 A1 * | 12/2010 | Johnson et al. | 277/405 |
| 2011/0203452 A1 | 8/2011 | Kucherov et al. | |
| 2011/0220281 A1 | 9/2011 | DiPietro | |
| 2014/0123844 A1 * | 5/2014 | Kumazawa et al. | 89/36.02 |

FOREIGN PATENT DOCUMENTS

| | | |
|---|---|---|
| JP | 62-207773 | 9/1987 |
| JP | 62-210397 | 9/1987 |
| JP | 4-319435 | 11/1992 |
| JP | 5-106999 | 4/1993 |
| JP | 6-115009 | 4/1994 |
| JP | 7-137199 | 5/1995 |
| JP | 8-206875 | 8/1996 |
| JP | 9-142948 | 6/1997 |
| JP | 9-169571 | 6/1997 |
| JP | 2001-261457 | 9/2001 |
| JP | 2003-225585 | 8/2003 |
| JP | 2008-504142 | 2/2008 |
| JP | 2008-184352 | 8/2008 |
| JP | 2008-275208 | 11/2008 |
| JP | 2009-215091 | 9/2009 |
| JP | 2009-534233 | 9/2009 |
| JP | 2010-513836 | 4/2010 |
| JP | 2010-210217 | 9/2010 |
| JP | 2012-072044 | 4/2012 |
| WO | WO 97/00734 | 1/1997 |

OTHER PUBLICATIONS

English translation of JP 09/142948; Jun. 1997.*
English translation of JP 2537597; Sep. 1996.*
English translation of JP 07/137199; May 1995; 11 pages.*
English translation of JP 2010/210217; Sep. 2010; 14 pages.*
English translation of JP 2008/275208; Nov. 2008; 18 pages.*

* cited by examiner

BORON CARBIDE-CONTAINING CERAMIC BONDED BODY AND METHOD FOR PRODUCING THE BONDED BODY

TECHNICAL FIELD

This invention relates to a bonded, boron carbide-containing ceramic body formed by bonding members into a larger one and capable of exhibiting a high bond strength, and also to a process for producing the bonded body. More specifically, the present invention is concerned with a technology for providing a large, boron carbide-containing ceramic member, which is formed of small, boron carbide-containing ceramic members strongly bonded together and integrated with a high bond strength and can be applied to a field where the large, silicon carbide-containing ceramic member operates at a high speed or is used under an environment in which a chemical reaction may occur. It is to be noted that the term "boron carbide-containing ceramic" as used herein means a ceramic formed from boron carbide as a forming material and containing boron carbide at 2 mass % or higher. The term "boron carbide-containing ceramic", therefore, encompasses ceramics ranging from ceramics having a boron carbide content of several mass % to ceramics composed of boron carbide as a principal component and containing boron carbide, for example, at 60 mass % or higher, and further, to high-purity boron carbide ceramics containing boron carbide at 99 mass % or higher.

BACKGROUND ART

Ceramics are widely used as structural members in industrial products as they are lightweight and hard and exhibit a high modulus of elasticity compared with metal materials. Boron carbide-containing ceramics are equipped with highest hardness and highest lightweight properties (bulk density: 2.5 $g/cm^3$) among practical ceramics, and are expected to find utility, for example, as structural materials or the like of metal members which operate at a high speed. Recently, a process has been developed for obtaining a high-density sintered body as high as 95% or higher of the theoretical density by normal sintering (see Patent Document 1), thereby making it possible to stably provide high-purity dense boron carbide ceramics at low price. Wide-spread utilization of boron carbide ceramics is thus expected from now on.

On the other hand, the move toward larger operating machine members is remarkable in recent years. Concerning, for example, optical aligners for semiconductor fabrication systems, said optical aligners making use of a ceramic material, stages as operating machine members are increasing in size year after year to meet the ever-increasing size of silicon wafers. Ceramic materials for use in such operating machine members are, therefore, required to have a greater area. To meet such a requirement, there is a need for making greater the industrial facilities and processing equipment in ceramic fabrication processes. This need is, however, accompanied by an enormous investment in plant and equipment, thereby developing an extremely serious, practical problem that the economy of products will be impaired.

Under these circumstances, a technology is attracting interests. According to this technology, a large component of excellent characteristics is produced at low cost by forming a plurality of small ceramic members and bonding and integrating the resultant small ceramic members together into a larger one. On this technology, research and development work is under way at various research institutes and business enterprises as will be mentioned below. It is, however, difficult to strongly bond and integrate ceramic-made small members together with a high bond strength. Especially to use such a bonded ceramic body as a high-speed operating machine member for which the use of a boron carbide-containing ceramic is expected, a still higher bond strength is required, leading to an outstanding desire for the establishment of a still better bonding technology.

As a method for bonding ceramic members together into a ceramic structural body, it has heretofore been a common practice to bond them via one of various brazing materials or to bond them via a glass. In Patent Document 2, for example, with a view to obtaining an appropriate bond strength commensurate with the kind of a ceramic, a proposal is made to conduct the bonding of a metal and the ceramic with a silver-copper-indium based, active brazing filler metal. In Patent Document 3, a ceramic-bonding composition composed of an aluminum-silicon oxynitride glass is proposed for use upon bonding ceramics of the same kind or different kinds.

In Patent Document 4, it is proposed to heat faces of ceramic structural bodies, said faces being to be bonded together, to 660° C. or higher and to bond the ceramic structural bodies together via an aluminum material under heat or pressure. Proposed in Patent Document 5 is a bonding process that homogenizes a bonding layer between sintered ceramic bodies with the ceramic of the sintered ceramic bodies. Specifically, it is proposed to interpose aluminum metal between aluminum substrates, and subsequent to heating, to conduct oxidation treatment such that the aluminum metal becomes similar aluminum as that of the substrates. In Patent Document 6, a bonded body is proposed in which a member made of aluminum or an aluminum alloy and a ceramic are bonded together via a bonding layer. It is also disclosed that the strength of the bonding layer depends on the quantity of an intermetallic compound formed in the bonding layer and also that the quantity of the intermetallic compound can be controlled by specifying the content of copper in an aluminum matrix contained in the bonding layer. Ceramics to which the bonding can be applied by the above-described technologies include silicon nitride, silicon carbide, sialon, zirconia, and the like.

In Patent Document 7, there is proposed a process that, to strongly bond together silicon nitride ceramics exhibiting high characteristics as engineering ceramics, forms small members having shapes that their faces to be bonded together are fittable to each other, fills a silicon-containing paste between the faces to be fitted to each other, and converting the silicon to silicon nitride in a nitrogen atmosphere.

PRIOR ART DOCUMENTS

Patent Documents

Patent Document 1: JP-A-2009-215091
Patent Document 2: JP-A-2003-225585
Patent Document 3: JP-A-62-128975
Patent Document 4: JP-A-9-142948
Patent Document 5: JP-A-6-115009
Patent Document 6: JP-A-8-206875
Patent Document 7: JP-A-2008-184352

DISCLOSURE OF THE INVENTION

Problem to Be Solved by the Invention

However, the above-mentioned various conventional technologies are accompanied by one or more problems to be described below. Further, there are examples of the bonding of ceramics which make use of boron carbide as a sintering aid and contain an extremely trace amount of boron carbide, but no study has been made even about the bonding of those making use of boron carbide as a ceramic-forming material. In particular, no study has been made at all about the bonding of members having a high boron carbide content or dense boron carbide-containing ceramic members having a high boron carbide content, said bonding being an ultimate object of the present invention. There is, hence, a much-awaited desire for the development of a bonding technology that can provide a large boron carbide-containing ceramic member integrated with a high bond strength and usable even as a high speed-operating machine member such as a stage to be used with a silicon wafer carried thereon in an optical aligner for a semiconductor fabrication system. As the high bond strength required in this case, the strength of the bonded part may be preferably 100 MPa or higher, more preferably 200 MPa or higher.

The brazing material employed in the technology described in the above-cited Patent Document 2 is an active metal brazing material, which is of the silver-copper-indium system and contains a trace amount of titanium. Owing to the inclusion of the active metal, ceramics can be bonded together by a single treatment. However, ceramics the constituent materials of which differ from each other cannot all be bonded together with the active metal brazing material, thereby needing to choose an optimal composition for each ceramic. This technology is, therefore, not a simple method. The technology described in the above-cited Patent Document 3 uses, as a bonding material, an oxynitride glass which is advantageous in cost, and is described to be also applicable to the bonding of ceramics making use of boron carbide as a sintering aid. However, boron which is a principal component of boron carbide readily mixes in a glass component. It is, therefore, considered that upon bonding ceramics containing boron carbide as a forming material as intended in the present invention, the characteristics of the bonded part and the like are significantly modified and the material of the resulting integrated large member lacks homogeneity. As will also be described below, no report has been made about a simple bonding method capable of achieving a high bond strength upon bonding high-purity boron carbide ceramics together.

The technologies described in Patent Documents 4 and 5 each use aluminum for bonding aluminum-based ceramics together. In these documents, no discussion is made about the bonding of other ceramics, especially, the bonding of boron carbide-containing ceramic members themselves. The technology described in Patent Document 6 also relates to the bonding of a member made of aluminum or an aluminum alloy with a ceramic, and no discussion is made about the bonding of boron carbide-containing ceramic members themselves. High shear strengths are disclosed, but are not so high as the bond strength intended in the present invention. Moreover, this technology requires metallization treatment to faces of ceramics, at which the ceramics are to be bonded together. In view of combining and integrating plural small members into a larger one, the practice of this technology is considered to require extremely high process cost. Furthermore, the technology of Patent Document 7 requires to configure opposite faces of ceramics, where the ceramics are to be bonded together, into mutually-fitting shapes to realize strong bonding between the ceramics themselves. There is, accordingly, a desire for a technology that can strongly bond ceramic members together at flat faces thereof. Upon bonding ceramics containing silicon nitride as a principal component, this technology requires to use a paste containing silicon as a principal component and to include a step to nitride this paste in a dry nitrogen atmosphere. Also in this respect, high cost is unavoidable, and thus, there is room for improvements.

In the course of developments of the present invention, the present inventors came to recognize a new problem in bonded, boron carbide-containing ceramic bodies as will be described hereinafter. Described specifically, boron carbide-containing ceramics themselves are excellent in chemical resistance but, when they are combined into a bonded body, the bonded part is inferior in chemical resistance so that the bonded body may not be used depending on the application. It is, accordingly, necessary to provide the bonded part of a bonded, boron carbide-containing ceramic body with improved chemical resistance.

Therefore, an object of the present invention is to provide a new technology relating to a bonded body, which is obtained by bonding boron carbide-containing ceramics together by a simple method and exhibits an extremely high strength of 100 MPa or higher in terms of bond strength. Another object of the present invention is to provide a new technology relating to a bonded, boron carbide-containing ceramic body having improved chemical resistance at a bonded part thereof as needed. A further object of the present invention is to provide a process for producing, without using a special material, by a simple method and economically, a bonded, boron carbide-containing ceramic body of a large size or complex shape, which can be used even as a high speed-operating machine member, has been bonded and integrated with an extremely high bond strength, and is provided with improved chemical resistance at a bonded part thereof as needed. A still further object of the present invention is to provide at least one of the above-described new technologies and to enable wide-spread utilization of boron carbide-containing ceramics which are materials excellent in functionality.

Means for Solving the Problem

The above-described objects can be achieved by the present invention to be described hereinafter. Described specifically, the present invention provides a bonded, boron carbide-containing ceramic body comprising ceramic members each containing boron carbide at 2 mass % or higher and integrated together via a bonding layer bonded with a bonding material containing at least one metal selected from the group consisting of aluminum, copper, gold and zirconium or integrated together via a bonding layer formed from one of aluminum metal and an aluminum compound and a titanium compound as bonding materials, wherein a bonded part has a strength of 100 MPa or higher.

As preferred embodiments of the above-described bonded, boron carbide-containing ceramic body, the ceramic members may each contain boron carbide at 60 mass % or higher, and the bonding layer may have a thickness of 1 to 1,000 μm.

In another embodiment of the present invention, there is provided a process for producing the above-described bonded, boron carbide-containing ceramic body. Depending on the bonding material to be used, there are the following two processes. In the first process, a metal of aluminum, copper, gold or zirconium or an alloy of the metal as a base is used as a bonding material.

(First Process)

Provided is a process for producing any one of the above-described bonded, boron carbide-containing ceramic bodies, which comprises, upon bonding together the ceramic members each containing boron carbide at 2 mass % or higher, interposing a bonding material, which is selected from a foil, paste or vapor deposition layer comprised of a metal of aluminum, copper, gold or zirconium or an alloy of the metal as a base, between parts of the ceramic members, said parts being to be bonded together, such that the bonding material has a thickness in a range of not greater than 1,000 µm, and while holding the ceramic members and bonding material as they are, heating both the ceramic members at least at parts to be bonded together, where the ceramic members are to be bonded together, at a temperature of 600° C. or higher but 1,600° C. or lower in air, under vacuum conditions or in an inert atmosphere.

When aluminum metal or an aluminum-based alloy is used as a bonding material in the above description, the range of heating temperatures at which the bonded, boron carbide-containing ceramic body is obtained with a still better strength differs depending on the heating atmosphere. As heating conditions, the following three modes (1) to (3) can be mentioned.

(1) Under vacuum conditions, at least the parts to be bonded together may be heated preferably at a temperature of 600° C. or higher but lower than 1,200° C.

(2) In an inert atmosphere, at least the parts to be bonded together may be heated preferably at a temperature of 600° C. to 1,500° C.

(3) In air, at least the parts to be bonded together may be heated preferably at a temperature of 600° C. or higher but lower than 800° C.

When a metal of copper, gold or zirconium or an alloy of the metal as a base is used as a bonding material in the above description, on the other hand, the parts to be bonded together may be heated preferably at a temperature of 700° C. or higher but 1,600° C. or lower.

(Second Process)

Provided is a process for producing any one of the above-described bonded, boron carbide-containing ceramic bodies, which comprises, upon bonding together the ceramic members each containing boron carbide at 2 mass % or higher, applying a slurry-form or paste-form titanium compound in a form of a sheet to parts of the ceramic members, said parts being to be bonded together, to interpose the sheet with a thickness in a range of not greater than 1,000 µm, holding the ceramic members in close contact with the sheet being interposed therebetween, arranging a bonding material containing a powder of aluminum metal or a powder of an aluminum compound over the parts to be bonded together, and conducting heating at a temperature of 600° C. or higher but lower than 1,200° C. under vacuum conditions or in an inert atmosphere such that the aluminum or aluminum compound is allowed to infiltrate into the titanium compound in the parts to be bonded together and the ceramic members are bonded together.

Advantageous Effects of the Invention

According to the present invention, there is provided a bonded, boron carbide-containing ceramic body obtained by bonding together boron carbide-containing ceramic members, each of which contains boron carbide at 2 mass % or higher, together by a simple method and having a high bond strength of 100 MPa or higher. According to the present invention, the selection of a bonding material also makes it possible to provide a bonded, boron carbide-containing ceramic body having excellent chemical resistance at a bonded part thereof in addition to a high bonding strength. The present invention, therefore, can provide a bonded, boron carbide-containing ceramic member of a large size or complex shape, which is bonded and integrated with such an extremely high bond strength as enabling its use even as a high speed-operating machine member, and also a boron carbide-containing ceramic member with improved chemical resistance at a bonded part thereof as needed. The term "bond strength" as used herein collectively means strengths that a bonded body exhibits.

BRIEF DESCRIPTION OF THE DRAWINGS

FIG. 2-1 is a microstructure of a bonded part in a bonded, boron carbide-containing ceramic body making use of aluminum metal as a bonding material.

FIG. 2-2 is another microstructure of the bonded part in the bonded, boron carbide-containing ceramic body making use of aluminum metal as the bonding material.

FIG. 2-3 is a further microstructure of the bonded part in the bonded, boron carbide-containing ceramic body making use of aluminum metal as the bonding material.

FIG. 3-1 is a microstructure of a bonded part in a bonded, boron carbide-containing ceramic body making use of copper as a bonding material.

FIG. 3-2 is a microstructure of a bonded part in a bonded, boron carbide-containing ceramic body making use of gold as a bonding material.

MODES FOR CARRYING OUT THE INVENTION

Figure 1:
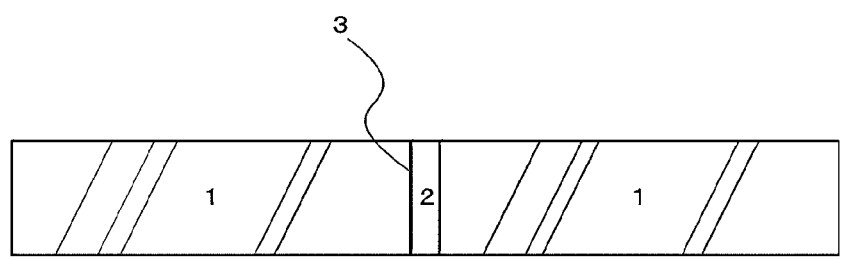
FIG. 1 is a schematic view showing a cut section of ceramic members with a bonding material arranged therebetween upon production of a bonded body according to the present invention.

The present invention will hereinafter be described in detail based on preferred embodiments of the present invention. The present inventors enthusiastically conducted research to solve the problems of the above-described conventional technologies, and as a first embodiment, found that a strongly bonded state of 100 MPa or higher in bond strength can be realized by interposing a foil, paste or vapor deposition layer, which contains aluminum or an aluminum compound as a principal component, between boron carbide-containing ceramic members containing boron carbide at 2 mass % or higher or preferably containing boron carbide at 60 mass % or higher, and holding the members together with a trace amount of aluminum interposed therebetween, and conducting heating at a temperature of 600° C. or higher although this heating temperature varies depending on the heating atmosphere.

In the course of proceeding with a detailed study on such boron carbide-containing ceramic bodies as described above, the present inventors also came to recognize that a bonded, boron carbide-containing ceramic body making use of aluminum metal or an aluminum compound as a bonding material can be one provided with an excellent bond strength, but is inferior in chemical resistance at the bonded part thereof and may not be used depending on the application, and accordingly, that there is room for improvements.

The present inventors enthusiastically conducted a further study to solve the newly-recognized problem. As a result, it has been found that as a second embodiment, by using, as a bonding material, one containing at least one metal selected from the group consisting of copper, gold and zirconium, a strongly bonded state of 100 MPa or higher in bond strength can be realized on ceramic members with boron carbide contained at 2 mass % or higher (hereinafter simply called "boron carbide-containing ceramic members), and moreover, the bonded part is provided with sufficient chemical resistance, no matter which one of the metals is contained.

With a view to providing a bonded part with improved chemical resistance, the present inventor conducted a still further study. As a result, it has been found as a third embodiment, the combined use of a titanium compound can achieve an improvement in chemical resistance even when aluminum is used as a bonding material. Described specifically, by using aluminum metal and a titanium compound or an aluminum compound and a titanium compound as bonding materials, the resulting bonded body can realize a strongly bonded state of 100 MPa or higher in bond strength, and at the same time, can provide a bonded part with improved chemical resistance, compared with the above-mentioned case in which aluminum metal or the aluminum compound is used as a bonding material. Compared with the second embodiment in which gold or the like is used as a bonding material, this third embodiment has a merit in that bonding with improved chemical resistance is feasible with an economical material.

Here, what the bond strength between members themselves is 100 MPa or higher means that the bonded part is of substantially the same level in use as the strength of a boron carbide-containing ceramic itself. Bonded, boron carbide-containing ceramic bodies of large sizes or diverse shapes integrated in such a bonded state are, therefore, by no means inferior in strength to large members or members of diverse shapes produced with boron carbide-containing ceramics themselves without bonding processing.

It is not certain why bonded, boron carbide-containing ceramic bodies having a strongly bonded state of 100 MPa or higher in bond strength are available by the above-described first to third embodiments. Based on the results of a detailed study on the bonded parts, the present inventors, however, consider as will be described hereinafter.

First, a description will be made about the first embodiment in which aluminum or an aluminum compound (hereinafter aluminum metal will be taken as an example) is used as a bonding material. As aluminum interposed between boron carbide-containing ceramic members themselves is good in wetness with boron carbide, aluminum is considered to be readily and evenly spreadable over faces to be bonded together. Further, aluminum forms various compounds with boron carbide, including aluminum borides and compounds of aluminum, carbon and boron. It is considered that, when one of a foil, paste and vapor deposition layer which contains aluminum, for example, at 90 mass % or higher is used as a bonding material and is interposed in a trace amount between boron carbide-containing ceramic members and heating is conducted at a temperature of the melting point of aluminum or higher while holding the boron carbide-containing ceramic members and the bonding material as they are, the trace amount of aluminum spreads in an even state over the faces to be bonded together and boron carbide and aluminum react to form a bonding layer in which they exist as a mixture. Described specifically, in the bonding layer, aluminum exists in the form of aluminum metal, and further, aluminum borides, aluminum carboborides and the like are formed so that aluminum is fused with boron carbide. The bonding layer is, hence, in a state that they exist as a mixture. It is, accordingly, inferred that as a result of the bonding of the boron carbide members themselves via such a bonding layer, a bonded, boron carbide-containing ceramic body, which exhibits an extremely high bond strength of 100 MPa or higher substantially close to the strength of a ceramic formed solely of boron carbide as a matrix material, or preferably 300 MPa or higher and has been by no means obtainable by the conventional technologies, has been obtained.

Figures 1, 2:
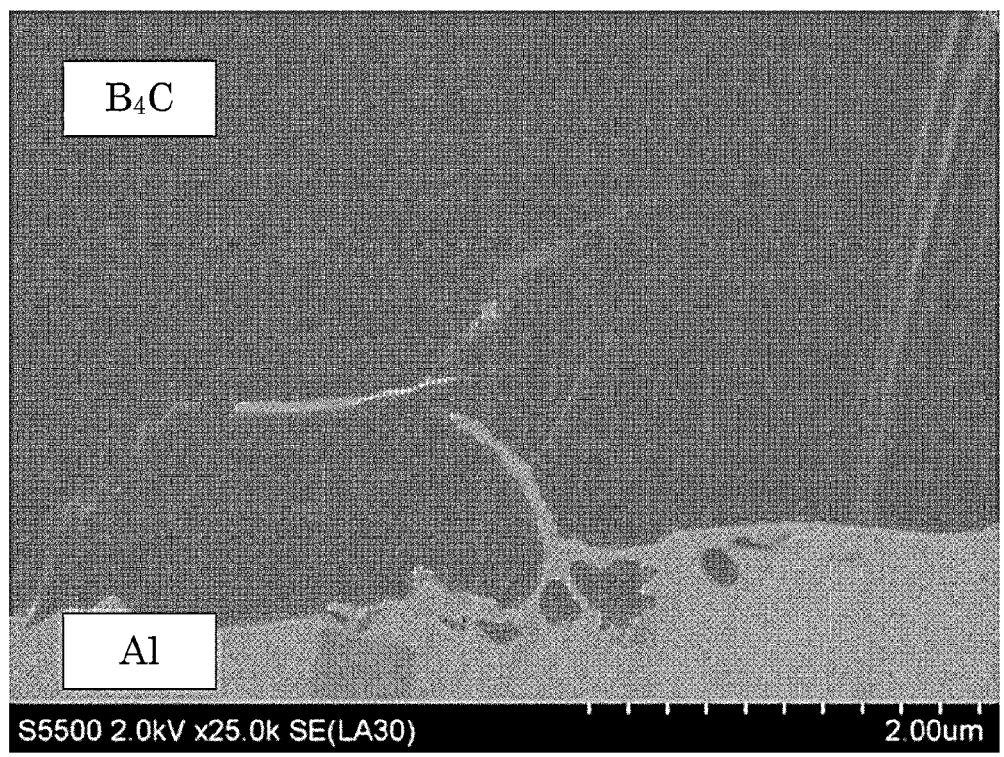
Figure 2:
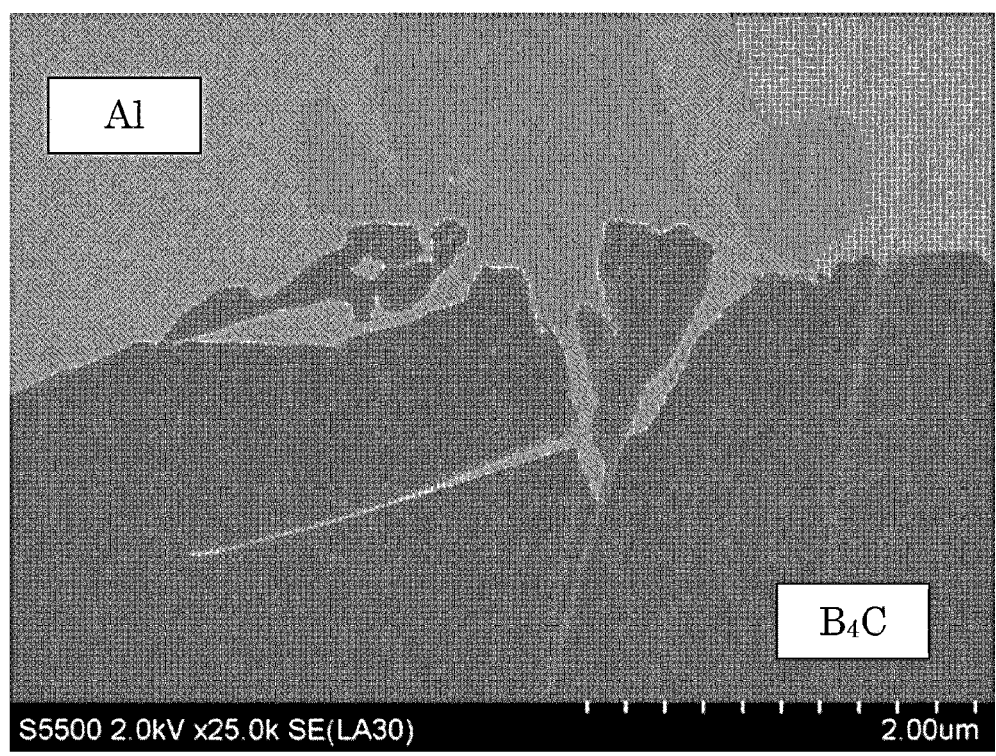
Figures 2, 3:
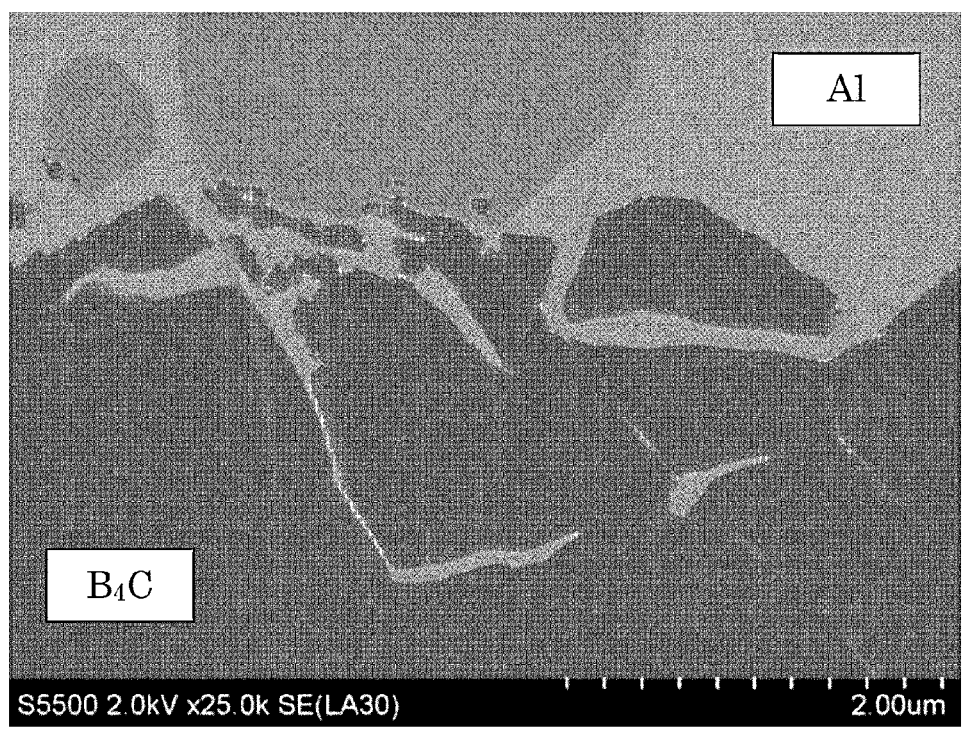
Figures 1, 3:
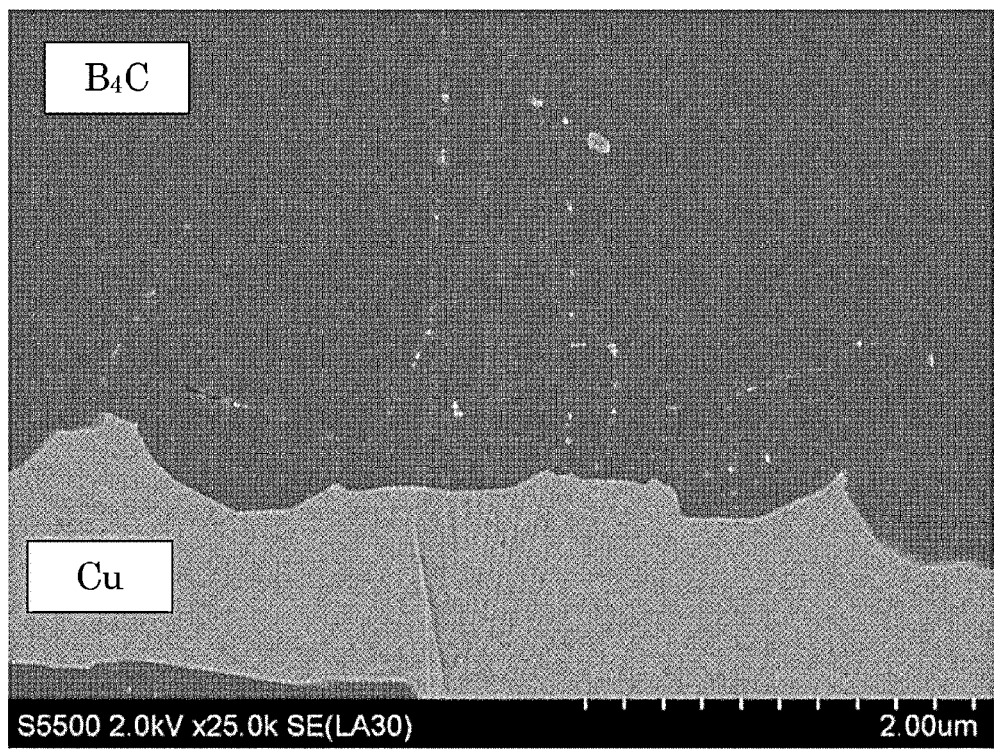
Figures 2, 3:
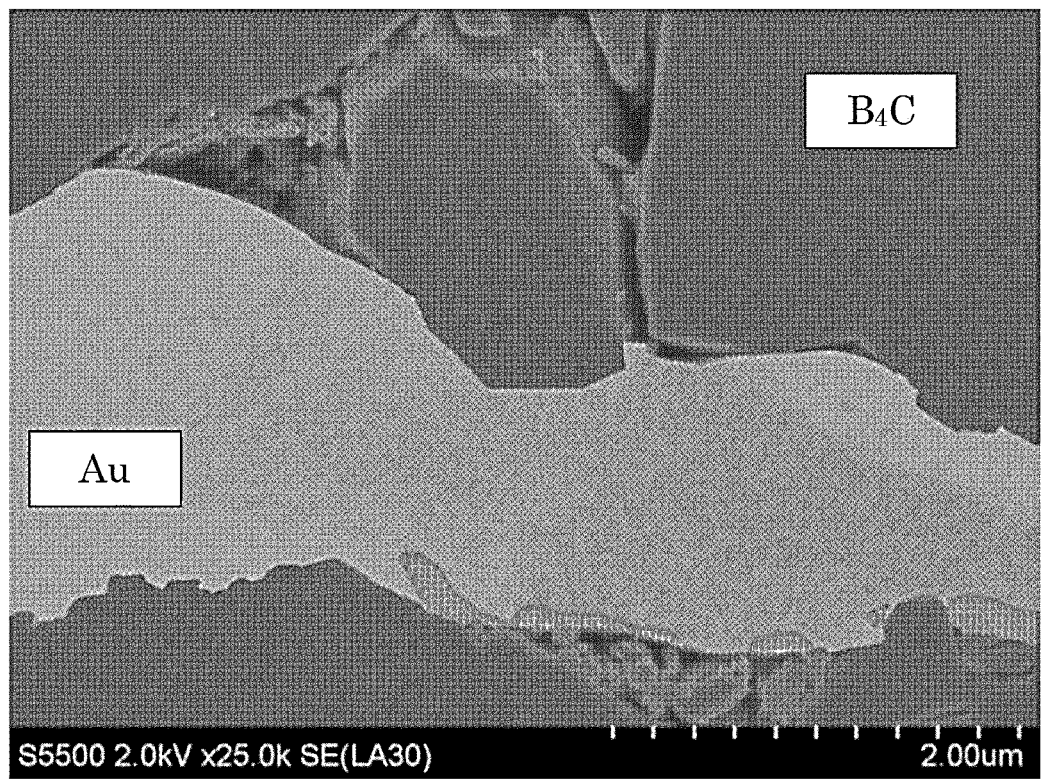

To verify the foregoing, the present inventors conducted a detailed study on a bonded part in a bonded, boron carbide-containing ceramic body making use of aluminum as a bonding material. First, the microstructure of a bonding layer in the bonded body was observed using SEM (scanning electron micrograph). SEM picture images obtained as a result are shown in FIG. 2-1 to FIG. 2-3. As shown in these drawings, it was confirmed that in the first embodiment, numerous cracks or pores, for example, of 1,000 nm (1 µm) and smaller and large cracks and pores having aspect ratios of 5 and greater existed in the bonded faces of sintered boron carbide bodies as bodies bonded together, and moreover, aluminum infiltrated to the extremely narrow internal ends of these cracks or pores to form a bonding layer. It is, therefore, inferred from the foregoing that in the bonded, boron carbide-containing ceramic body of the first embodiment that made use of aluminum as a bonding material, aluminum and boron carbide fused together to achieve strong bonding, high-infiltration aluminum entered, at the time of the bonding, even to the extremely narrow portions in numerous cracks or pores formed on the order of nanometers in the bonded faces of the sintered boron carbide bodies, and as a result, aluminum formed strong bonding (so-called anchoring effect) while filling out hair cracks, and an extremely high bond strength which had not been conventionally achieved was developed at the bonded part of the bonded, boron carbide-containing ceramic body.

A still further detailed study was conducted about the components of the bonding layer formed as described above. As a result, it was confirmed that aluminum metal and at least one of aluminum carboborides (e.g., $Al_3BC$, $Al_3B_{48}C_2$, $AlB_{12}C_2$, $Al_8B_4C_7$, $Al_2B_{51}C_8$, $AlB_{40}C_4$, $AlB_{24}C_4$, and the like), aluminum borides (e.g., $AlB_2$, $AlB_{10}$, $AlB_{12}$, and the like) and aluminum carbides (e.g., $Al_4C_3$) existed in the bonding layer. The present inventors consider that the mixed existence of at least one of these reaction products of aluminum and boron carbide in the bonding layer is also a part of the reason for the formation of the extremely strong bond.

A description will next be made about the second embodiment. In this embodiment, the use of one containing at least one metal selected from the group consisting of copper, gold and zirconium as a bonding material can realize a strongly bonded state of 100 MPa or higher in bond strength on ceramic members containing boron carbide at 2 mass % or higher, preferably 60 mass % or higher, and moreover, the bonded part is provided with sufficient chemical resistance, no matter which one of the metals is contained.

Boron carbide-containing ceramic members can be bonded together in a strongly bonded state of 100 MPa or higher in bond strength, for example, by the extremely simple process that interposes one of a foil, paste and vapor deposition layer of a metal of copper, gold or zirconium or an alloy of the metal as a base as a bonding material between parts to be bonded together, holds the respective boron carbide-containing ceramic members in place with the metal interposed in a trace amount therebetween, and at a temperature of 700° C. or higher but 1,600° C. or lower, heats the parts to be bonded together. Compared with the above-mentioned bonded, boron carbide-containing ceramic body according to the first embodiment, which made use of aluminum as a bonding material, the bonded part is provided with improved chemical resistance although the bonding temperature is higher. The use of a metal of copper, gold or zirconium or an alloy of the metal as a base as a bonding material for the bonding of boron carbide-containing ceramic members with each other, therefore, enables to spread the utility of the resulting bonded body to Application where chemical resistance is required. It is, hence, possible to promote a further enlargement of the utility of bonded, boron carbide-containing ceramic bodies.

Although it is not certain why the bonded, boron carbide-containing ceramic body having the strongly bonded state of 100 MPa or higher in bond strength is also available by the above-described second embodiment, the present inventors consider as will be described hereinafter. The bonding material, which is interposed between the boron carbide-containing ceramic members themselves and is comprised of copper or gold or an alloy of one of the metals as a base, is considered to be readily and evenly spreadable over faces to be bonded together irrespective of the metal in the bonding material by interposing the bonding material between the faces to be bonded and conducting heating to a predetermined temperature or higher. The advantageous effects of the present invention can also be brought about even when an alloy making use of the above-described metal as a base is used. A description will hereinafter be described taking the respective metals as examples.

The microstructure of a bonding layer in a bonded body when copper out of the metals specified in the second embodiment was used as a bonding material was observed using SEM as in the case where aluminum was used as a bonding material in the first embodiment. As a result, it was confirmed, as in the case of the first embodiment described above, that copper infiltrated inside cracks or pores in a bonded face of each boron carbide ceramic member (see FIG. 3-1). It is, therefore, considered that, when copper was used as a bonding material, the ceramic members were strongly integrated together owing to the anchoring effect of copper and a decrease in defects as in the case where aluminum metal was used as a bonding material.

In an SEM picture of a bonded part making use of gold, which is specified in the second embodiment, as a bonding material, no infiltration into cracks or pores in the bonded face of each boron carbide ceramic member was observed as shown in FIG. 3-2. From this, it is considered that a sufficient bond strength was developed as a result of direct strong bonding at a ceramic interface via gold although gold does not react with boron carbide even when it is allowed to fuse. A bonded body of a high bond strength was also obtained when zirconium, the melting point (1,857° C.) of which is high among the metals specified in the second embodiment, was used as a bonding material. However, zirconium does not obviously fuse in the predetermined temperature range specified in the present invention or so. It is, therefore, considered that, when zirconium was used, the heating allowed a portion of zirconium to react with boron carbide, and as a result, the realization of the high bond strength was achieved.

According to a detailed study on forming components of each bonding layer formed as described above, it was confirmed that the bonding layer making use of copper or gold contained no compound formed through a reaction with boron carbide and was composed of the metal element. It was also confirmed that in the bonding layer making use of zirconium, on the other hand, all of zirconium, zirconium boride ($ZrB_2$) and zirconium carbide (ZrC) exist. The above-described inference was supported accordingly. From these results, it is, therefore, considered that, when zirconium was used, carbon and boron from the boron carbide component in the ceramic members and zirconium reacted to form these compounds and the bonding layer was formed with these compounds mixed therein in addition to the metal element.

From the results of the above study, it is considered that, when zirconium was used as a bonding material, as in the case where aluminum was used as a bonding material, the metal used as the bonding material existed as it was in the bonding layer, and in addition, the used metal fused with boron carbide to form borides, carboborides and the like of the metal in the bonding layer, bonding was achieved with these metal, borides, carboborides and the like mixed together, and as a result, strong bonding was realized. It is also considered that, when copper was used as a bonding material, on the other hand, as in the case where aluminum was used as a bonding material, strong integration of ceramic members themselves was realized by the anchoring effect of copper and a decrease in defects in view of the phenomenon that cracks or pores existed in a surface of each ceramic member and the copper component infiltrated to the interiors of these cracks of pores.

As mentioned above, aluminum metal and a titanium compound, or an aluminum compound and a titanium compound are used in the third embodiment of the present invention. In this case, a bonded, boron carbide-containing ceramic body can be conveniently produced, for example, by such a process as will be described below. Upon bonding boron carbide-containing ceramic members together, a slurry-form or paste-form titanium compound is first applied in a form of a sheet to parts of the ceramic members, said parts being to be bonded together, to interpose the sheet with a thickness in a range of not greater than 1,000 μm, and the ceramic members are held in close contact with the sheet being interposed therebetween. Over the parts to be bonded together where the titanium compound is interposed, a bonding material containing a powder of aluminum metal or a powder of an aluminum compound is arranged, and heating is conducted at a temperature of 600° C. or higher but lower than 1,200° C. under vacuum conditions or in an inert atmosphere such that the aluminum or aluminum compound is allowed to infiltrate into the parts which are to be bonded together and include the titanium compound, and the ceramic members are bonded together.

According to a study by the present inventors, in the third embodiment of the present invention in which either aluminum metal or an aluminum compound and a titanium compound are used as bonding materials, a variety of compounds containing aluminum and at least one of carbon, boron, silicon and titanium exist in addition to aluminum metal in the bonding layer. Described specifically, it was confirmed that one or more of aluminum carboborides (for example, $Al_3BC$, $Al_3B_{48}C_2$, $AlB_{12}C_2$, $Al_8B_4C_7$, $Al_2B_{51}C_8$, $AlB_{40}C_4$, $AlB_{24}C_4$, etc.), aluminum borides (for example, $AlB_2$, $AlB_{10}$, $AlB_{12}$, etc.), aluminum carbides (for example, $Al_4C_3$), titanium carbide (TiC), titanium boride ($TiB_2$), aluminum-titanium alloy ($TiAl_3$), and aluminum-silicon alloy ($TiSi_2$) existed in the bonding layer. From this, it is considered that owing to the combined use of the titanium compound, a bonding layer formed of constituent components different from the case where bonding was conducted using aluminum metal or an aluminum compound as a bonding material was formed, and as a result, the bonded part was provided with excellent chemical resistance.

A description will hereinafter be made about the composition of the bonded, boron carbide-containing ceramic body according to the pre sent invention. First, any ceramic members can be subjected to bonding insofar as they each contain boron carbide at 2 mass % or higher. Their components differ depending on the application, and those having different boron carbide contents may be selectively used as desired. For an application, for example, where a relatively high toughness value is required, it is preferred to use carbides containing boron carbide at 2 to 3 mass %, typically ceramic members containing silicon carbide as a principal component. For an application where an operation is performed at a high speed and a high positional accuracy is required, on the other hand, it is preferred to use ceramic members in a composition range of high boron carbide contents, for example, those having a value of 60 mass % or higher, desirably 80 mass % or higher in terms of boron carbide content. If dense boron carbide-containing ceramics having a purity of 80 mass % or higher, desirably 99 mass % or higher and a density as high as 95 mass % or more of the theoretical density as boron carbide-containing ceramic members, for example, the resulting bonded, boron carbide-containing ceramic body can be a large one which is lightweight and hard, exhibits a high modulus of elasticity, and moreover, satisfies a high bond strength and, if necessary, chemical resistance at the bonded part. As the shape of each boron carbide-containing ceramic member, the boron carbide-containing ceramic member may preferably be provided at a part thereof with a face which is to be bonded and is as planar as possible. No other restriction is imposed on the shape of each boron carbide-containing ceramic member, so that the shape can be designed at will according to an intended bonded body of a large size or complex shape.

The above-described, bonded, boron carbide-containing ceramic body according to the present invention can be easily and stably obtained by the below-described production process of the present invention without using any special material or equipment. A detailed description will hereinafter be made about the production process according to the present invention. A production process for bonded bodies according to the first and second embodiment of the present invention and a production process for a bonded body according to the third embodiment of the present invention will, however, be described separately, because they are partially different in production steps.

(Process for the Production of Bonded Bodies According to the First and Second Embodiments)

According to the production process of the present invention, a bonded body is obtained by first providing plural boron carbide-containing ceramic members to be bonded together, interposing a bonding material, which contains at least one metal selected from the group consisting of aluminum, copper, gold and zirconium, between faces of these members, said faces being to be bonded together, holding the members and bonding material as they are, and then heating the members at least at parts thereof, where the members are to be bonded together. As mentioned above, the conditions of each resulting bonding layer differ depending on the metal material used as a bonding material, but boron carbide-containing ceramic members can be strongly bonded together whichever metal material is. Further, the use of one containing any one of copper, gold and zirconium as a bonding material makes it possible to obtain a bonded body provided at each bonded part thereof with excellent chemical resistance in addition to a high bond strength.

As the bonding material to be used for interposition between the faces to be bonded together as described above, one of a foil, paste and vapor deposition layer, which contain as a base at least one metal element in the group consisting of aluminum, copper, gold and zirconium (for example, which contains the base metal at 90 mass % or higher, preferably 99% or higher), may be used with a thickness in a range of preferably 1,000 μm and smaller, more preferably 100 μm and smaller, still more preferably 50 μm and smaller. The foil, paste or vapor deposition layer may be arranged preferably with a thickness the lower limit of which is 5 μm or greater or at least several micrometers. According to a study by the present inventors, it is impossible to obtain such a high bond strength as intended in the present invention if the amount of the metal interposed between the faces to be bonded together is too much. As a specific example, a so-called metal foil which has a thickness of 10 μm, 50 μm, 100 μm or so and is available from the market may preferably be interposed between the faces to be bonded together, although its thickness varies depending on the material used.

As other methods for interposing a bonding material between parts to be bonded together, the below-described methods can be mentioned. These methods include a method that applies a paste-form bonding material with a powder of one of the above-described metals dispersed in a liquid medium such as an organic solvent or the like to a thickness in the above-described range onto one of faces of boron carbide-containing ceramic members, said faces being to be bonded together, a method that vapor-deposits one of the above-described metals onto one of the faces, which are to be bonded together, to a thickness in the above-described range to form a vapor deposition layer, and a method that flame-sprays one of the above-described metals to interpose it.

As the bonding material for use in the present invention, a material can be used with various purities insofar as the material contains one of the above-described metals. The higher the purity of the metal, the better. It is desired, for example, to use a material containing one of the above-described metals in a range of 90 mass % and higher. The present invention is, however, not limited to such a bonding material, and one containing another component in addition to one of the above-described metals can also be used as a bonding material. For example, alloys with copper, manganese, magnesium, silicon, zinc or the like contained as a component other than aluminum can be used as bonding materials. Alloys with zinc, tin, aluminum, nickel, lead, manganese or the like contained as a component other than copper can also be used as bonding materials. Alloys with copper, silver, nickel or the like contained as a component other than gold can also be used as bonding materials. Alloys with tin, iron, nickel, chromium or the like contained as a component other than zirconium can also be used as bonding materials. It is to be noted that, when an alloy is used as a bonding material, the melting point of the bonding material drops substantially, and therefore, the heating temperature for the parts to be bonded together can be determined as desired with the melting point of the bonding material, which is to be used, in mind.

After the above-described bonding material with the one of the metals contained therein is interposed between parts of boron carbide-containing ceramic members, said parts being to be bonded together, as described above, the ceramic members and bonding material are held in place by a jig of carbon, a heat resistant metal or the like such that they are held as they are. Upon holding them in place, the members may be clamped together, or may be held under unloaded conditions insofar as the members do not come out of alignment or do not move. In the present invention, heating is next conducted at least at the parts to be bonded together in the above-described state to bond the boron carbide-containing ceramic members together. A description will hereinafter be made about heating conditions.

In the course of carrying a detailed study on heating conditions, the present inventors found that what is especially important in the present invention is to interpose one of the above-described metals in a not-too-much, trace amount between parts of boron carbide-containing ceramic members, said parts being to be bonded together, upon heating. When aluminum, copper or gold or an alloy thereof is used as a bonding material, it is only necessary, as temperature conditions for heating, to conduct the heating at a temperature equal to or higher than the melting point of the metal or alloy used. It is, therefore, unnecessary to specify the heating temperature conditions in particular detail. It was, however, found that the realization of a stronger bond needs heating in a temperature range which is suited for the bonding material used according to heating conditions other than the temperature. A description will hereinafter be made separately for every metal usable in the bonding material.

A description will now be made about the use of aluminum or its alloy as a bonding material. In this case, the heating atmosphere may be under vacuum conditions, or may be an inert atmosphere (Ar or $N_2$) or air. It has, however, been confirmed that, when desired to provide a strongly-bonded body which exhibits a strength of 100 MPa or higher at the bonded part thereof, heating may preferably be conducted to reach the below-described temperature range depending on the heating atmosphere, and as a result, a strongly-bonded, boron carbide-containing ceramic body can be stably obtained as intended in the present invention.

Specifically, the heating conditions are as follows.

(1) When heating under vacuum conditions, at least the parts to be bonded together may be heated preferably at a temperature of 600° C. to 1,200° C.

(2) When heating under an inert atmosphere, at least the parts to be bonded together may be heated preferably at a temperature of 600° C. to 1,500° C.

(3) When heating in air, at least the parts to be bonded together may be heated preferably at a temperature of 600° C. or higher but lower than 800° C.

As optimal ranges in which bonded bodies of higher strength can be obtained, the above-described heating temperature may range as will be described below although it differs depending on the heating atmosphere and the bonding material and ceramic members to be used. When heating under vacuum conditions, it is preferred to heat in a temperature range of 800 to 1,100° C., with 900 to 1,100° C. being more preferred. When heating under an inert atmosphere, it is preferred to heat in a temperature range of 1,200° C. or higher but 1,500° C. or lower. According to the present invention, a strongly-bonded body can be obtained even by heating in air. In this case, however, the heating temperature is required to be lower than 800° C. at which boron carbide has been known to undergo significant oxidation, and it is preferred to conduct heating especially in a temperature range of 600° C. or higher but 700° C. or lower.

A description will be made about the use of a metal of copper, gold or zirconium or an alloy of the metal as a base as a bonding material. When copper or its alloy or gold or its alloy is used as a bonding material, it is only necessary to conduct heating at a temperature equal to or higher of the melting point of the metal or alloy used, for example, heating may be conducted at 700° C. or higher, more preferably in a temperature range of 1,200° C. or higher but 1,600° C. or lower, still more preferably 1,200° C. or higher but 1,500° C. or lower. According to a study by the present inventors, it was found that, when zirconium is used as a bonding material, strong bonding becomes feasible when heated at 1,200° C. or higher, at which zirconium reacts with boron carbide, although the melting point of zirconium is as high as 1,857° C. or higher. It was also found that for the realization of stronger bonding, heating may suitably be conducted in the below-described temperature range according to heating conditions other than the temperature.

First, when copper, gold or zirconium is used as a bonding material, the heating atmosphere may be under vacuum conditions or may be an inert atmosphere (Ar or $N_2$). When desired to stably obtain a strongly-bonded body which exhibits a strength of 100 MPa or higher at the bonded part thereof, heating may preferably be conducted to reach the below-described temperature range depending on the heating atmosphere, although the temperature range varies depending on the kind of the metal. Described specifically, when heating under vacuum conditions, heating may be conducted in a temperature range of preferably 700 to 1,600° C., more preferably 1,200 to 1,500° C. When heating under an inert atmosphere, on the other hand, heating may be conducted preferably in a temperature range of 1,200° C. or higher but 1,600° C. or lower.

Further, the heating time may be set for several hours, specifically 1 to 3 hours or so although it varies depending on the kind of the metal used as a bonding material, the kind of ceramic members, and the size of parts to be bonded together. Subsequent annealing results in the integration of the ceramic members via a bonding layer, thereby making it possible to easily obtain a bonded, boron carbide-containing ceramic body of 100 MPa or higher bond strength according to the present invention. If the material of the bonding material to be used and the heat treatment conditions are selectively determined in the production process according to the present invention, it is possible to obtain a bonded body of a higher bond strength of preferably 140 MPa or higher, more preferably 160 MPa or higher, still more preferably 200 MPa or higher, even still more preferably 300 MPa or higher.

(Process for the Production of Bonded Body According to the Third Embodiment)

A bonded, boron carbide-containing ceramic body excellent not only in bond strength but also in chemical resistance as mentioned above can also be obtained by a simple process when one of aluminum metal and an aluminum compound and a titanium compound are used for the formation of a bonding part instead of the above-described case. Described specifically, by using the above-described material as a bonding material and complexing aluminum and the titanium compound, boron carbide-containing ceramic members can also be strongly bonded together, and moreover, the resulting bonded body can be provided with improved chemical resistance. A production process for this case will hereinafter be described in detail.

First, a slurry or paste of the titanium compound is coated onto one of parts of the boron carbide-containing ceramic members, said parts being to be bonded together. As the slurry of the titanium compound, it is preferred to use one prepared by mixing a powder of a titanium compound such as titanium carbide or titanium nitride, a binder, and a dispersant in a ball mill. As a specific coating method, the slurry of the titanium compound is coated thin onto one of the faces of the members, said faces being to be bonded together, by doctor blade coating or screen printing, and both the members are held in place by a jig of carbon, a heat resistant metal or the like such that they are held as they are. Upon holding them in place, the members may be clamped together, or may be held under unloaded conditions insofar as the members do not come out of alignment or do not move. In this state, a powder of aluminum metal or a powder of an aluminum-containing metal is placed at least over the parts of the members, said parts being to be bonded together, and heating is conducted to fuse the powder of aluminum metal or the powder of the aluminum-containing metal such that the fused aluminum metal or aluminum-containing metal is allowed to infiltrate into the parts to be bonded together. As the powder of the aluminum-containing metal, it is possible to use, for example, a powder, which has been obtained by mixing aluminum and silicon at a mass percentage ratio of 50:50, or a like powder can be used.

Metals and their compounds, which exist in the above-described bonding layer formed as a result of the bonding treatment by the above-described production process of the bonded, boron carbide-containing ceramic body, can be measured by a surface analysis method making use of electron probe microanalyzers (EPMA) [wavelength dispersive spectrometer (WDS) and energy dispersive spectrometer (EDS)]

or by an X-ray analyzer making use of a transmission electron microscope (TEM). Measurement is also feasible by identifying the crystalline structure by X-ray diffractometry (XRD). According to a study by the present inventors, the range of a bonding layer in which one or more carboboride compounds of one or more forming components of a bonding material exists or exist depends on conditions and may range from 1 to 300 μm or so, although it varies depending on the thickness of the interposed bonding material and the holding method such as clamping. Concerning a relationship between the bond strength of the resultant bonded body and the range in which the bonding layer is formed, a more detailed study is needed. To achieve a higher strength, however, the thickness of the bonding layer may be set preferably at 10 to 100 μm or so.

The chemical resistance of the bonded, boron carbide-containing ceramic body of this invention obtained as described above can be determined and evaluated, for example, by such a method as will be described hereinafter. The strength of the bonded body integrated via the bonding layer is measured, and its value is assumed to be P1. After the bonded body is immersed at room temperature for 72 hours in an aqueous 2 mol/L solution of a strong acid or strong alkali, the strength of the bonded body is measured, and its value is assumed to be P2. As a chemical to be used, hydrochloric acid, nitric acid, sulfuric acid or the like can be used as needed where acid resistance is required, but sodium hydroxide or the like can be used as needed where alkali resistance is required. A value determined by (P1−P2)/P1 is defined as a residual strength rate, and an evaluation can be made depending on whether or not this value is close to 1. For example, one having a residual strength rate of 0.8 or greater may be determined to be equipped with chemical resistance, and may then be used.

EXAMPLES

The present invention will be described in further detail based on its examples and comparative examples.

First Embodiment

Example A-1-I

Relationship Between the Thickness of Bonding Material and Strength

Provided in pairs were 99% high-purity, plate-shaped, boron carbide ceramic members of 20 mm×20 mm×4.5 mm such that at least one side of each bonded body after bonding would have a total length of 40 mm. Also provided as bonding materials were aluminum foils having an aluminum content of 99.8 mass % and different thicknesses of 5 to 1,000 μm. Between parts of the two boron carbide-containing ceramic members in the respective pairs, said parts being to be bonded together, the aluminum foils of the different thicknesses were arranged and held, respectively, with a care to avoid that the aluminum foils would be twisted or folded on themselves to result in an uneven thickness, and the ceramic members were held in place by carbon jigs, respectively. Under heating conditions that at least the parts to be bonded together were heated to a temperature of 1,000° C. under vacuum conditions, bonding treatment was conducted to obtain bonded bodies.

Further, two boron carbide ceramic members similar to those described above were provided, and a paste of aluminum dispersed in a butyl alcohol-based solvent was coated by screen printing to a thickness of 10 μm on a face to be bonded of a part to be bonded of one of the ceramic members. Furthermore, two boron carbide ceramic members similar to those described above were provided, and in a vacuum, aluminum was deposited to a thickness of 6 μm on a face to be bonded of a part to be bonded of one of the ceramic members. The ceramic members were held in place by carbon jigs, respectively, in a similar manner as described above, and under similar heating conditions as described above, bonding treatment was conducted to obtain bonded bodies in each of which the corresponding two boron carbide-containing ceramic members were bonded together.

By machining the respective bonded bodies, which were obtained as described above, according to JIS R1601 (Bending Strength Testing Method for Fine Ceramics), test specimens of 3 mm thickness, 4 mm width and 40 mm length were prepared with bonded parts being located centrally. Using the test specimens so obtained, they were measured for transverse rupture strength according to the JIS, and the measurement results are shown in Table 1. Further, the bonded parts formed by the bonding treatment were observed at side walls of the respective test specimens under a microscope to measure the ranges, in which aluminum and one or more aluminum compounds existed, as the thicknesses of the bonding layers. The measurement results are collectively shown in Table 1.

TABLE 1

Example A-1-I - Relationship between Thicknesses of Bonding Materials and Bond Strengths

| Example A-1 | Bonding material | | | Heat treatment conditions | | | Thickness of bonding layer (μm) | Transverse rupture strength (MPa) |
|---|---|---|---|---|---|---|---|---|
| | Kind | Thickness (μm) | Holding conditions | Temp. (° C.) | Time (hr) | Atmosphere | | |
| A-1-1 | Al foil | 5 | Clamped | 1,000 | 2 | Vacuum | 1 | 288 |
| A-1-2 | Al foil | 5 | Unloaded | 1,000 | 2 | Vacuum | 4.8 | 325 |
| A-1-3 | Al foil | 10 | Unloaded | 1,000 | 2 | Vacuum | 9.6 | 369 |
| A-1-4 | Al foil | 50 | Unloaded | 1,000 | 2 | Vacuum | 47.2 | 355 |
| A-1-5 | Al foil | 100 | Unloaded | 1,000 | 2 | Vacuum | 96.2 | 293 |
| A-1-6 | Al foil | 300 | Unloaded | 1,000 | 2 | Vacuum | 288 | 198 |
| A-1-7 | Al foil | 500 | Unloaded | 1,000 | 2 | Vacuum | 486 | 177 |
| A-1-8 | Al foil | 1,000 | Unloaded | 1,000 | 2 | Vacuum | 960 | 156 |
| A-1-9 | Al paste | 10 | Unloaded | 1,000 | 2 | Vacuum | 3 | 275 |
| A-1-10 | Vapor-deposited Al | 6 | Unloaded | 1,000 | 2 | Vacuum | 3 | 239 |

Example A-1-II

Conditions of Bonding Layer

A bonding layer in a bonded body obtained as will be described below was examined in detail. As a representative, sintered boron carbide bodies were ground with a #200 wheel stone to provide two plates of 50×50×10 mm in a pair as boron carbide-containing ceramic members. Also provided was an aluminum foil having an aluminum content of 99.8 mass % and a thickness of 100 µm. Between parts of the two boron carbide-containing ceramic members, said parts being to be bonded together, the aluminum foil was arranged and held with a care to avoid that the aluminum foil would be twisted or folded on itself, and the ceramic members were held in place by a carbon jig. Under heating conditions that the parts to be bonded together were heated to a temperature of 1,000° C. under vacuum conditions, a bonded body was obtained. The thus-obtained test specimen was cut, and grinding was conducted. Using an SEM, the bonding layer in the bonded body was observed for microstructure. The resulting SEM pictures are shown in FIG. 2-1 to FIG. 2-3.

As a result, as shown in FIG. 2-1 to FIG. 2-3, numerous cracks or pores of widths of 1 µm (1,000 nm) and smaller and large cracks having aspect ratios of 5 and greater existed in each bonded face of the sintered boron carbide body as the bonded body. It was also confirmed that the bonding layer was formed with aluminum infiltrated to extremely narrow portions of internal ends of those cracks. In all of FIG. 2-1 to FIG. 2-3, the cracks were actually measured for length and width, and the measurement results are shown in Table 2. In addition, their aspect ratios were also calculated, and the calculation results are also shown in Table 2.

TABLE 2

Measurement of Cracks in FIG. 2-1 to FIG. 2-3

|  | Crack dimensions | | Aspect |
|---|---|---|---|
|  | Length (nm) | Width (nm) | ratio |
| FIG. 2-1 | 1,158 | 21 | 55.0 |
|  | 842 | 63 | 13.3 |
| FIG. 2-2 | 2,211 | 21 | 105.0 |
|  | 1,305 | 147 | 8.9 |
|  | 1,158 | 105 | 11.0 |
| FIG. 2-3 | 1,158 | 21 | 55.0 |
|  | 1,032 | 84 | 12.3 |
|  | 1,579 | 105 | 15.0 |
|  | 632 | 105 | 6.0 |
|  | 947 | 147 | 6.4 |
|  | 1,158 | 105 | 11.0 |

From these facts, the strong bonds which have been unavailable to date are considered to have been achieved in the sintered boron carbide-containing bodies by the above-described process for the reasons to be described hereinafter. First, aluminum and boron carbide fuse together to strongly bond together. Further, a sintered boron carbide body itself has a fracture toughness value as small as 2 to 3 MPa·m$^{1/2}$, and therefore, cannot avoid the formation of numerous hair cracks in its surface upon machining. According to the above-described bonding method, on the other hand, high-infiltration aluminum is interposed between such parts to be bonded together. It is assumed that upon bonding, aluminum hence infiltrates into numerous cracks on the order of nanometers formed in the face of each sintered boron carbide body, said face being to be bonded, and forms a strong bond (anchoring effect) while filling up the extremely narrow hair cracks as illustrated in FIG. 2-1 to FIG. 2-3, and that as a result, a high strength which has been unavailable to date has been developed at the bonded part. In other words, the present invention makes use of cracks formed in a surface of a sintered boron carbide body upon machining, said cracks having been basically considered to act as defects that induce a reduction in strength, for bonding by interposing high-infiltration aluminum between parts to be bonded together, and achieves an extremely strong bond owing to the above-described anchoring effect.

Further, the bonding layer was analyzed using EPMA and XRD. As a result, it was confirmed that aluminum metal primarily existed in the bonding layer, and in addition, aluminum carboborides ($Al_3BC$, $Al_2B_{48}C_2$, $AlB_{12}C_2$, $Al_8B_4C_7$, $Al_2B_{51}C_8$, $AlB_{40}C_4$, $AlB_{24}C_4$), aluminumborides ($AlB_2$, $AlB_{10}$, $AlB_{12}$) and aluminum carbides (e.g., $Al_4C_2$) also existed.

Comparative Example A-1

Plural ceramic members similar to those used in Example A-1 were provided, and as bonding materials, silicon of 200 µm thickness and an oxynitride glass of 100 µm thickness were also provided. Using those ceramic members in pairs and the bonding materials, respectively, the production of bonded bodies was attempted by conducting heating for 2 hours in a nitrogen atmosphere under corresponding temperature conditions shown in Table 3. Despite the heat treatment at the high temperatures of 1,500° C. and higher, respectively, in the nitrogen atmosphere, the ceramic members were not bonded together in any pair. The production conditions in Comparative Example A-1 are collectively shown in Table 3.

TABLE 3

Conditions for Bonding Treatment in Comparative Example A-1

| | Bonding material | | | Heat treatment conditions | | | Thickness | Transverse rupture |
|---|---|---|---|---|---|---|---|---|
| Comp. Ex. A-1 | Kind | Thickness (µm) | Holding conditions | Temp. (° C.) | Time (hr) | Atmo-sphere | of bonding layer (µm) | strength (MPa) |
| A-1-1 | Silicon | 200 | Unloaded | 1,500 | 2 | Nitrogen | — | Not bonded |
| A-1-2 | Silicon | 200 | Unloaded | 1,600 | 2 | Nitrogen | — | Not bonded |
| A-1-3 | Silicon | 200 | Unloaded | 1,700 | 2 | Nitrogen | — | Not bonded |
| A-1-4 | Oxynitride glass | 100 | Unloaded | 1,500 | 2 | Nitrogen | — | Not bonded |
| A-1-5 | Oxynitride glass | 100 | Unloaded | 1,600 | 2 | Nitrogen | — | Not bonded |

TABLE 3-continued

Conditions for Bonding Treatment in Comparative Example A-1

| Comp. Ex. A-1 | Bonding material | | Heat treatment conditions | | | Thickness of bonding layer (μm) | Transverse rupture strength (MPa) |
|---|---|---|---|---|---|---|---|
| | Kind | Thickness (μm) | Holding conditions | Temp. (° C.) | Time (hr) | Atmosphere | | |
| A-1-6 | Oxynitride glass | 100 | Unloaded | 1,700 | 2 | Nitrogen | — | Not bonded |

Evaluation Results

As shown in Table 3, in Comparative Example A-1 in which the bonding of the boron carbide ceramic members was attempted using silicon or the oxynitride glass as a bonding material, it was impossible to bond the members together. In Example A-1 in which the bonding was conducted using the aluminum foils up to 1,000 μm thickness as bonding materials, on the other hand, the heating at 1,000° C., which is a temperature higher than the melting point of aluminum, made it possible to obtain the bonded bodies, each of which exhibited the high transverse rupture strength substantially equal to that of the boron carbide ceramic as a base material, irrespective of the thickness of the bonding material used. It was also confirmed that, when aluminum was interposed between the faces to be bonded together by applying it as a paste or conducting its vapor deposition, the bonded bodies which exhibited the high bond strengths, respectively, were also obtained.

Example A-2

Comparative Example A-2

Using boron carbide ceramic members of the same shape and same kind as those in Example A-1 and aluminum foils having an aluminum content of 99.8 mass % and 10 μm thickness, bonding treatment was conducted by changing the heating temperature stepwise in a temperature range of 500 to 1,200° C. Other conditions for the bonding treatment were set constant by conducting heating under vacuum conditions for 2 hours while clamping the ceramic members together at a value of 5 kg/cm² or so by carbon jigs, respectively. With respect to the thus-obtained bonded bodies, the thicknesses and strengths of their bonding layers were measured as in Example A-1. The results so obtained and the heating conditions are shown in Table 4.

TABLE 4

Example A-2 and Comparative Example A-2 - Relationship between Heating Temperatures and Bond Strengths

| | Bonding material | | | Heat treatment conditions | | | Thickness of bonding layer (μm) | Transverse rupture strength (MPa) |
|---|---|---|---|---|---|---|---|---|
| | Kind | Thickness (μm) | Holding conditions | Temp. (° C.) | Time (hr) | Atmosphere | | |
| Ex. A-2-1 | Al foil | 10 | Clamped | 600 | 2 | Vacuum | 8 | 189 |
| Ex. A-2-2 | Al foil | 10 | Clamped | 700 | 2 | Vacuum | 8 | 288 |
| Ex. A-2-3 | Al foil | 10 | Clamped | 800 | 2 | Vacuum | 6 | 306 |
| Ex. A-2-4 | Al foil | 10 | Clamped | 900 | 2 | Vacuum | 6 | 322 |
| Ex. A-2-5 | Al foil | 10 | Clamped | 1,000 | 2 | Vacuum | 5 | 385 |
| Ex. A-2-6 | Al foil | 10 | Clamped | 1,100 | 2 | Vacuum | 5 | 369 |
| Comp. Ex. A-2-1 | Al foil | 10 | Clamped | 1,200 | 2 | Vacuum | — | Not bonded |
| Comp. Ex. A-2-2 | Al foil | 10 | Clamped | 500 | 2 | Vacuum | — | Not bonded |

Evaluation Results

As shown in Table 4, bonding was not achieved in Comparative Example A-2-2 in which the treatment was conducted under conditions of vacuum and 500° C. As shown in Examples A-2-1 to A-2-6, on the other hand, the bonded bodies which exhibited the high bond strengths, respectively, were obtained in the temperature range of 600 to 1,100° C. In Comparative Example A-2-1 in which the treatment was conducted under conditions of 1,200° C., however, aluminum evaporated and bonding was not achieved.

Example A-3

Comparative Example A-3

Using boron carbide ceramic members of the same shape and same kind as those in Example A-1 and aluminum foils having an aluminum content of 99.8 mass % and 10 μm thickness, bonding treatment was conducted in an inert gas atmosphere by changing the heating temperature stepwise in a temperature range of 1,200 to 1,600° C. Other conditions for the bonding treatment were set constant by conducting heating for 2 hours while clamping the ceramic members together at a value of 5 kg/cm² or so by carbon jigs, respectively. With respect to the thus-obtained bonded bodies, the thicknesses and strengths of their bonding layers were measured as in Example A-1. The results so obtained and the heating conditions are shown in Table 5.

TABLE 5

Example A-3 and Comparative Example A-3 - Bonding in Inert Gas Atmosphere

| | Bonding material | | | Heat treatment conditions | | | Thickness of bonding layer (μm) | Transverse rupture strength (MPa) |
|---|---|---|---|---|---|---|---|---|
| | Kind | Thickness (μm) | Holding conditions | Temp. (° C.) | Time (hr) | Atmo-sphere | | |
| Ex. A-3-1 | Al foil | 10 | Clamped | 1,200 | 2 | Ar | 5 | 330 |
| Ex. A-3-2 | Al foil | 10 | Clamped | 1,200 | 2 | $N_2$ | 5 | 305 |
| Ex. A-3-3 | Al foil | 10 | Clamped | 1,500 | 2 | Ar | 4 | 263 |
| Ex. A-3-4 | Al foil | 10 | Clamped | 1,500 | 2 | $N_2$ | 4 | 220 |
| Comp. Ex. A-3-1 | Al foil | 10 | Clamped | 1,600 | 2 | Ar | — | Not bonded |
| Comp. Ex. A-3-2 | Al foil | 10 | Clamped | 1,600 | 2 | $N_2$ | — | Not bonded |

Example A-4

Comparative Example A-4

Using boron carbide ceramic members of the same shape and same kind as those in Example A-1 and aluminum foils having an aluminum content of 99.8 mass % and 10 μm thickness, bonding treatment was conducted in air to determine whether or not bonding would be feasible. With respect to the thus-obtained bonded body, the thickness and strength of its bonding layer were measured as in Example A-1. The results so obtained and the heating conditions are shown in Table 6.

TABLE 6

Example A-4 and Comparative Example A-4 - Bonding in Air

| | Bonding material | | | Heat treatment conditions | | | Thickness of bonding layer (μm) | Transverse rupture strength (MPa) |
|---|---|---|---|---|---|---|---|---|
| | Kind | Thickness (μm) | Holding conditions | Temp. (° C.) | Time (hr) | Atmo-sphere | | |
| Ex. A-4 | Al foil | 10 | Clamped | 700 | 2 | Air | 8 | 160 |
| Comp. Ex. A-4 | Al foil | 10 | Clamped | 800 | 2 | Air | — | Not bonded |

Evaluation Results

As shown in Table 6, in air, the bonded body which exhibited the high transverse rupture strength was obtained when treated at 700° C., but, when treated at 800° C., boron carbide was oxidized, bubbling was observed on the surface, and no bonding was achieved. Further, as shown in Table 5, it was confirmed that in the inert gas atmospheres, bonding was achieved at up to 1,500 by the bonding at the high temperatures of 1,200° C. and higher and the bonded bodies, which exhibited the high transverse rupture strengths, respectively, were obtained, in both the argon atmosphere and nitrogen atmosphere. At the higher temperature of 1,600° C., on the other hand, melting of boron carbide was observed, and no bonding was achieved.

Example A-5

Using boron carbide ceramic members similar to those employed in Examples A-1 to A-4 and also using, instead of the 99.8 mass % aluminum foils employed in Example A-1, foils composed of aluminum as a principal component, containing one or more components other than aluminum at 10% or lower and having 10 μm thickness, respectively, bonding was conducted at 1,000° C. for 2 hours in a vacuum to obtain bonded bodies. With respect to the respective bonded bodies so obtained, the thicknesses and transverse rupture strengths of their bonding layers were measured as in Example A-1. The measurement results are shown in Table 7. As a result, it was confirmed that some differences were recognized in transverse rupture strength depending on the component or components existing together in the aluminum material as the bonding material but the bonded bodies so obtained all exhibited the values greater than 100 MPa, respectively, and were high in bond strength.

TABLE 7

Example A-5 - Bonding by Different Bonding Materials

| | Bonding material | | | | Heat treatment conditions | | | Thickness of bonding layer (μm) | Transverse rupture strength (MPa) |
|---|---|---|---|---|---|---|---|---|---|
| | Al content (mass %) | Coexisting component (s) (mass %) | Thickness of Al foil (μm) | Holding conditions | Temp. (° C.) | Time (hr) | Atmo-sphere | | |
| Ref. Ex. | 99.8 | — | 10 | Clamped | 1,000 | 2 | Vacuum | 8 | 392 |
| Ex. A-5-1 | 94.3 | Cu-5.5 | 10 | Clamped | 1,000 | 2 | Vacuum | 8 | 320 |
| Ex. A-5-2 | 96.8 | Mn-1.3 + Mg-1.0 | 10 | Clamped | 1,000 | 2 | Vacuum | 7 | 295 |

TABLE 7-continued

Example A-5 - Bonding by Different Bonding Materials

| | Bonding material | | | Heat treatment | | | Thickness of bonding layer (μm) | Transverse rupture strength (MPa) |
|---|---|---|---|---|---|---|---|---|
| | Al content (mass %) | Coexisting component(s) (mass %) | Thickness of Al foil (μm) | Holding conditions | Temp. (° C.) | Time (hr) | Atmosphere | | |
| Ex. A-5-3 | 95.6 | Mg-4.1 | 10 | Clamped | 1,000 | 2 | Vacuum | 8 | 253 |
| Ex. A-5-4 | 97.2 | Si-0.4 + Mg-0.7 | 10 | Clamped | 1,000 | 2 | Vacuum | 7 | 169 |
| Ex. A-5-5 | 90.1 | Cu-1.3 + Mg-2.1 + Zn-5.2 | 10 | Clamped | 1,000 | 2 | Vacuum | 8 | 311 |

Example A-6

In place of the boron carbide ceramic members employed in Examples A-1 to A-4, boron carbide ceramic members having different boron carbide contents were provided. Using aluminum foils having an aluminum content of 99.8 mass % and 10 μm thickness, bonding was conducted at 1,000° C. for 2 hours in a vacuum to obtain bonded bodies, respectively. With respect to the respective bonded bodies so obtained, the thicknesses and transverse rupture strengths of their bonding layers were measured as in Example A-1, and the measurement results are shown in Table 8. As a result, the bonded body of Example A-6-1, which had been obtained by bonding together the members composed of silicon carbide as a principal component and containing boron carbide at 2 mass %, exhibited the high transverse rupture strength of 410 MPa because the strength of the base material is higher relative to boron carbide ceramics. It was also confirmed that irrespective of the content of boron carbide, the boron carbide ceramic members were all bondable and the bonded bodies which exhibited the high transverse rupture strengths, respectively, were obtained. Concerning the bonded body of Example A-6-6, a localized analysis was conducted on its bonding layer and its matrix adjacent to the bonding layer. In the bonding layer, aluminum boride was identified in addition to a trace amount of aluminum. Adjacent and around the bonding layer, a compound ($Al_3BC$) of aluminum and boron carbide was identified in addition to boron carbide as the matrix component.

Second Embodiment

Example B-1-I

Relationship Between the Thickness of Bonding Material and Strength

Provided in pairs were 99% high-purity, plate-shaped, boron carbide ceramic members of 20 mm×20 mm×4.5 mm such that at least one side of each bonded body after bonding would have a total length of 40 mm. Also provided as bonding materials were copper foils having a copper content of 99.8 mass % and different thicknesses of 5 to 1,000 μm. Between parts of the two boron carbide-containing ceramic members in the respective pairs, said parts being to be bonded together, the copper foils of the different thicknesses were arranged and held, respectively, with a care to avoid that the copper foils would be twisted or folded on themselves to result in an uneven thickness, and the ceramic members were held in place by carbon jigs, respectively. Under heating conditions that at least the parts to be bonded together were heated to a temperature of 1,500° C. under vacuum conditions, bonding treatment was conducted to obtain bonded bodies.

Further, two boron carbide ceramic members similar to those described above were provided, and a paste of copper dispersed in a butyl alcohol-based solvent was coated by screen printing to a thickness of 10 μm on a face to be bonded of a part to be bonded of one of the ceramic members. Furthermore, two boron carbide ceramic members similar to

TABLE 8

Example A-6 - Bonding of Ceramic Members Having Different Boron Carbide Contents

| | Base material | | Bonding material | | | Heat treatment | | | Thickness of bonding layer (μm) | Transverse rupture strength (MPa) |
|---|---|---|---|---|---|---|---|---|---|---|
| | $B_4C$ content (mass %) | Main residual component | Al content (mass %) | Thickness of Al foil (μm) | Holding conditions | Temp. (° C.) | Time (hr) | Atmosphere | | |
| Ex. A-6-1 | 2 | SiC | 99.8 | 10 | Clamped | 1,000 | 2 | Vacuum | 8 | 410 |
| Ex. A-6-2 | 15 | $TiB_2$ | 99.8 | 10 | Clamped | 1,000 | 2 | Vacuum | 4 | 290 |
| Ex. A-6-3 | 60 | SiC | 99.8 | 10 | Clamped | 1,000 | 2 | Vacuum | 8 | 362 |
| Ex. A-6-4 | 80 | SiC | 99.8 | 10 | Clamped | 1,000 | 2 | Vacuum | 8 | 311 |
| Ex. A-6-5 | 90 | SiC | 99.8 | 10 | Clamped | 1,000 | 2 | Vacuum | 8 | 325 |
| Ex. A-6-6 | 100 | — | 99.8 | 10 | Clamped | 1,000 | 2 | Vacuum | 8 | 368 | those described above were provided, and copper was deposited in a vacuum to a thickness of 6 μm on a face to be bonded of a part to be bonded of one of the ceramic members. The ceramic members were held in place by carbon jigs, respectively, in a similar manner as described above, and under similar heating conditions as described above, bonding treatment was conducted to obtain bonded bodies in each of which the corresponding two boron carbide-containing ceramic members were bonded together.

By machining the respective bonded bodies, which were obtained as described above, according to JIS R1601 (Bending Strength Testing Method for Fine Ceramics), test specimens of 3 mm thickness, 4 mm width and 40 mm length were prepared with bonded parts being located centrally. Using the test specimens so obtained, they were measured for transverse rupture strength according to the JIS, and the measurement results are shown in Table 9. Further, the bonded parts formed by the bonding treatment were observed at side walls of the respective test specimens under a microscope to measure the ranges, in which copper and one or more copper compounds existed, as the thicknesses of the bonding layers. The results are collectively shown in Table 9.

carbide-containing ceramic members. Also provided was a copper foil having a copper content of 99.8 mass % and a thickness of 100 μm. Between parts of the two boron carbide-containing ceramic members, said parts being to be bonded together, the copper foil was arranged and held with a care to avoid that the copper foil would be twisted or folded on itself, and the ceramic members were held in place by a carbon jig. Under heating conditions that the parts to be bonded together were heated to a temperature of 1,500° C. under vacuum conditions, a bonded body was obtained. The thus-obtained test specimen was cut, and grinding was conducted. Using SEM, the bonding layer in the bonded body was observed for microstructure. The resulting SEM picture is shown in FIG. 3-1.

Comparative Example B-1

Plural ceramic members similar to those used in Example B-1-I were provided, and as bonding materials, silicon of 200 μm thickness and an oxynitride glass of 100 μm thickness were also provided. Using those ceramic members in pairs and the bonding materials, respectively, the production of

TABLE 9

Example B-1 - Relationship between Thicknesses of Bonding Materials and Bond Strengths

| Example B-1 | Bonding material | | Heat treatment conditions | | | Thickness of bonding layer (μm) | Transverse rupture strength (MPa) |
|---|---|---|---|---|---|---|---|
| | Kind | Thickness (μm) | Holding conditions | Temp. (° C.) | Time (hr) | Atmosphere | | |
| B-1-1 | Copper foil | 5 | Clamped | 1,500 | 2 | Vacuum | 1 | 196 |
| B-1-2 | Copper foil | 5 | Unloaded | 1,500 | 2 | Vacuum | 4.4 | 145 |
| B-1-3 | Copper foil | 10 | Unloaded | 1,500 | 2 | Vacuum | 9.5 | 161 |
| B-1-4 | Copper foil | 50 | Unloaded | 1,500 | 2 | Vacuum | 48 | 167 |
| B-1-5 | Copper foil | 100 | Unloaded | 1,500 | 2 | Vacuum | 95 | 170 |
| B-1-6 | Copper foil | 300 | Unloaded | 1,500 | 2 | Vacuum | 285 | 182 |
| B-1-7 | Copper foil | 500 | Unloaded | 1,500 | 2 | Vacuum | 482 | 143 |
| B-1-8 | Copper foil | 1,000 | Unloaded | 1,500 | 2 | Vacuum | 978 | 158 |
| B-1-9 | Copper paste | 10 | Unloaded | 1,500 | 2 | Vacuum | 7 | 179 |
| B-1-10 | Vapor-deposited copper | 6 | Unloaded | 1,500 | 2 | Vacuum | 5 | 165 |

Example B-1-II

Conditions of Bonding Layers

A bonding layer in a bonded body obtained as will be described below was examined in detail. As a representative, sintered boron carbide bodies were ground with a #200 wheel stone to provide two plates of 50×50×10 mm in a pair as boron bonded bodies was attempted by conducting heating for 2 hours in a nitrogen atmosphere under corresponding temperature conditions shown in Table 10. Despite the heat treatment at the high temperatures of 1,500° C. and higher in the nitrogen atmosphere, the ceramic members were not bonded together in any pair. The production conditions in Comparative Example B-1 are collectively shown in Table 10.

TABLE 10

Conditions for Bonding Treatment and Bond Strengths in Comparative Example B-1

| Comp. Ex. B-1 | Bonding material | | Heat treatment conditions | | | Thickness of bonding layer (μm) | Transverse rupture strength (MPa) |
|---|---|---|---|---|---|---|---|
| | Kind | Thickness (μm) | Holding conditions | Temp. (° C.) | Time (hr) | Atmosphere | | |
| B-1-1 | Silicon | 200 | Unloaded | 1,500 | 2 | Nitrogen | — | Not bonded |
| B-1-2 | Silicon | 200 | Unloaded | 1,600 | 2 | Nitrogen | — | Not bonded |
| B-1-3 | Silicon | 200 | Unloaded | 1,700 | 2 | Nitrogen | — | Not bonded |
| B-1-4 | Oxynitride glass | 100 | Unloaded | 1,500 | 2 | Nitrogen | — | Not bonded |
| B-1-5 | Oxynitride glass | 100 | Unloaded | 1,600 | 2 | Nitrogen | — | Not bonded |

TABLE 10-continued

Conditions for Bonding Treatment and Bond Strengths in Comparative Example B-1

| Comp. Ex. B-1 | Bonding material | | | Heat treatment conditions | | | Thickness of bonding layer (μm) | Transverse rupture strength (MPa) |
|---|---|---|---|---|---|---|---|---|
| | Kind | Thickness (μm) | Holding conditions | Temp. (°C.) | Time (hr) | Atmosphere | | |
| B-1-6 | Oxynitride glass | 100 | Unloaded | 1,700 | 2 | Nitrogen | — | Not bonded |

Evaluation Results

As shown in Table 10, in Comparative Example B-1 in which the bonding of the boron carbide ceramic members was attempted using silicon or an oxynitride glass as a bonding material, it was impossible to bond the ceramic members together. In Example B-1 in which the bonding was conducted using the copper foils up to 1,000 μm thickness as bonding materials, on the other hand, the heating at 1,500° C., which is a temperature higher than the melting point of copper, made it possible to obtain the bonded bodies, each of which exhibited the high transverse rupture strength substantially equal to that of boron carbide ceramic as a base material, irrespective of the thicknesses of the bonding materials used. It was also confirmed that, when copper was interposed between the faces to be bonded together by applying it as a paste or conducting its vapor deposition, the bonded body which showed the high bond strength was also obtained.

Example B-2

Using boron carbide ceramic members of the same shape and same kind as those in Example B-1 and copper foils having a copper content of 99.9 mass % and 10 μm thickness, bonding treatment was conducted by changing the heating temperature stepwise in a temperature range of 1,200 to 1,600° C. Other conditions for the bonding treatment were set constant by conducting heating under vacuum conditions for 2 hours while clamping the ceramic members together at a value of 5 kg/cm² or so by carbon jigs, respectively. With respect to the thus-obtained bonded bodies, the thicknesses and strengths of their bonding layers were measured as in Example B-1. The results so obtained and the heating conditions are shown in Table 11. A study was also conducted using foils which were made of an alloy having a copper content of 90 mass % and had 10 μm thickness, and as a result, it has been confirmed that, even when the heat treatment temperature is 1,000° C. or lower, that is, lower than the melting point of copper, a bonded body capable of exhibiting a transverse rupture strength similar to the above-described ones can be obtained provided that the heat treatment temperature is higher than the melting point of the used alloy.

TABLE 11

Example B-2 - Relationship between Thicknesses of Bonding Layers and Bond Strengths When Copper Was Used as Bonding Material

| Example B-2 | Bonding material | | | Heat treatment conditions | | | Thickness of bonding layer (μm) | Transverse rupture strength (MPa) |
|---|---|---|---|---|---|---|---|---|
| | Kind | Thickness (μm) | Holding conditions | Temp. (°C.) | Time (hr) | Atmosphere | | |
| B-2-1 | Copper foil | 10 | Clamped | 1,200 | 2 | Vacuum | 4.8 | 105 |
| B-2-2 | Copper foil | 10 | Clamped | 1,300 | 2 | Vacuum | 4.5 | 139 |
| B-2-3 | Copper foil | 10 | Clamped | 1,400 | 2 | Vacuum | 3.4 | 186 |
| B-2-4 | Copper foil | 10 | Clamped | 1,500 | 2 | Vacuum | 3.2 | 211 |
| B-2-5 | Copper foil | 10 | Clamped | 1,600 | 2 | Vacuum | 3.2 | 141 |

Example B-3

In place of the boron carbide ceramic members employed in Example B-1, boron carbide ceramic members having different boron carbide contents were provided. Using copper foils having a copper content of 99.8 mass % and 10 μm thickness, bonding was conducted at 1,500° C. for 2 hours in a vacuum to obtain bonded bodies, respectively. With respect to the respective bonded bodies so obtained, the thicknesses and transverse rupture strengths of their bonding layers were measured as in Example B-1, and the measurement results are shown in Table 12. As a result, it was confirmed that irrespective of the content of boron carbide, the boron carbide ceramic members were all bondable and the bonded bodies which exhibited the corresponding high transverse rupture strengths were obtained. Concerning the bonded body of Example B-3-6, a localized analysis was conducted on its bonding layer and its base material adjacent to the bonding layer. In the bonding layer, a trace amount of copper was identified.

TABLE 12

Example B-3 - Bonding of Ceramic Members Having Different Boron Carbide Contents

| Example B-3 | Base material | | Bonding material | | | Heat treatment conditions | | | Thickness of bonding layer (μm) | Transverse rupture strength (MPa) |
|---|---|---|---|---|---|---|---|---|---|---|
| | B$_4$C content (mass %) | Main residual component | Copper content (mass %) | Thickness of copper foil (μm) | Holding conditions | Temp. (°C.) | Time (hr) | Atmosphere | | |
| B-3-1 | 2 | SiC | 99.8 | 10 | Clamped | 1,500 | 2 | Vacuum | 8 | 170 |
| B-3-2 | 15 | TiB$_2$ | 99.8 | 10 | Clamped | 1,500 | 2 | Vacuum | 4 | 191 |
| B-3-3 | 60 | SiC | 99.8 | 10 | Clamped | 1,500 | 2 | Vacuum | 8 | 194 |
| B-3-4 | 80 | SiC | 99.8 | 10 | Clamped | 1,500 | 2 | Vacuum | 8 | 201 |
| B-3-5 | 90 | SiC | 99.8 | 10 | Clamped | 1,500 | 2 | Vacuum | 8 | 205 |
| B-3-6 | 100 | — | 99.8 | 10 | Clamped | 1,500 | 2 | Vacuum | 8 | 211 |

Example B-4

Using boron carbide ceramic members of the same shape and same kind as those in Example B-1 and gold foils having a gold content of 99.95 mass % and 10 μm thickness, bonding treatment was conducted by changing the heating temperature stepwise in a temperature range of 1,200 to 1,600° C. Other conditions for the bonding treatment were set constant by conducting heating under vacuum conditions for 2 hours while clamping the ceramic members together at a value of 5 kg/cm$^2$ or so by carbon jigs, respectively. With respect to the thus-obtained bonded bodies, the thicknesses and strengths of their bonding layers were measured as in Example B-1. The measurement results and the heating conditions are shown in Table 13.

TABLE 13

Example B-4 - Relationship between Thicknesses of Bonding Layers and Bond Strengths When Gold Was Used as Bonding Material

| Example B-4 | Bonding material | | | Heat treatment conditions | | | Thickness of bonding layer (μm) | Transverse rupture strength (MPa) |
|---|---|---|---|---|---|---|---|---|
| | Kind | Thickness (μm) | Holding conditions | Temp. (°C.) | Time (hr) | Atmosphere | | |
| B-4-1 | Gold foil | 10 | Clamped | 1,200 | 2 | Vacuum | 4.8 | 105 |
| B-4-2 | Gold foil | 10 | Clamped | 1,300 | 2 | Vacuum | 4.5 | 171 |
| B-4-3 | Gold foil | 10 | Clamped | 1,400 | 2 | Vacuum | 3.4 | 164 |
| B-4-4 | Gold foil | 10 | Clamped | 1,500 | 2 | Vacuum | 3.2 | 146 |
| B-4-5 | Gold foil | 10 | Clamped | 1,600 | 2 | Vacuum | 3.2 | 160 |

Example B-5

Using boron carbide ceramic members of the same shape and same kind as those in Example B-1 and zirconium foils having a zirconium content of 99.2 mass % and 100 μm thickness, bonding treatment was conducted at heating temperatures of 1,400° C. and 1,500° C., respectively. Other conditions for the bonding treatment were set constant by conducting heating under vacuum conditions for 2 hours while clamping the ceramic members together at a value of 5 kg/cm$^2$ or so by carbon jigs, respectively. With respect to the thus-obtained bonded bodies, the thicknesses and strengths of their bonding layers were measured as in Example B-1. The measurement results and the heating conditions are shown in Table 14. It was confirmed that not only zirconium metal but also both of zirconium boride (ZrB$_2$) and zirconium carbide (ZrC) existed in the bonding layers making use of zirconium in this example.

TABLE 14

Example B-5 - Relationship between Thicknesses of Bonding Layers and Bond Strengths when Zr Was Used as Bonding Material

| Example B-5 | Bonding material | | Heat treatment conditions | | | Thickness of bonding layer (μm) | Transverse rupture strength (MPa) |
|---|---|---|---|---|---|---|---|
| | Kind | Thickness (μm) | Holding conditions | Temp. (° C.) | Time (hr) | Atmosphere | | |
| B-5-1 | Zr foil | 100 | Clamped | 1,400 | 2 | Vacuum | 100 | 102 |
| B-5-2 | Zr foil | 100 | Clamped | 1,500 | 2 | Vacuum | 100 | 104 |

Third Embodiment

Example B-6

Between boron carbide ceramic members in pairs, said boron carbide ceramic members being of the same shape and kind as those of Example B-1, a titanium carbide (TiC) slurry was tape-cast by the doctor-blade method, and aluminum or a 50:50 by mass % mixture of aluminum and silicon was placed over parts to be bonded together. While conducting heat treatment, the bonding materials were allowed to infiltrate in a vacuum in a heating temperature range of 1,000 to 1,100° C. to complete bonding treatment. The measurement results and heating conditions are shown in Table 15.

TABLE 15

Example B-6 - Relationship between Thicknesses of Bonding Layers and Bond Strengths when TiC—Al or TiC—Al—Si Was Used as Bonding Material

| Example B-6 | Bonding material | | | Heat treatment conditions | | | Thickness of bonding layer (μm) | Transverse rupture strength (MPa) |
|---|---|---|---|---|---|---|---|---|
| | Kind | Thickness (μm) | Holding conditions | Temp. (° C.) | Time (hr) | Atmosphere | | |
| 6-1 | TiC—Al | 50 | Clamped | 1,000 | 0.5 | Vacuum | 50 | 245 |
| 6-2 | TiC—Al | 50 | Clamped | 1,100 | 0.5 | Vacuum | 50 | 176 |
| 6-3 | TiC—Al—Si | 50 | Clamped | 1,000 | 0.5 | Vacuum | 50 | 227 |

Referential Example B-2

Provided were bonded bodies (which were centrally provided with bonded parts, respectively) of 3 mm×4 mm×40 mm in a form of a bend test specimen, which had been bonded under the below-described conditions, respectively, by using aluminum foils of 10 μm thickness as bonding materials, and the bonded parts were examined for chemical resistance (alkali resistance). The bonded bodies as test specimens were immersed at room temperature for 72 hours in a 2 mol/L aqueous solution of sodium hydroxide to compare differences in the strengths of the test specimens before and after the immersion. Described specifically, the test specimens before and after the immersion test were separately measured for 4-point bend strengths as transverse rupture strengths according to the JIS as in Example B-1. Using their values, the test specimens were evaluated for chemical resistance. The evaluation results are shown in Table 16. The transverse rupture strength of each bonded body before the immersion test was assumed to be P1, and the transverse rupture strength of the bonded body after the immersion test was assumed to be P2. A residual strength rate was calculated according to (P1−P2)/P1×100(%), and the calculation result is shown as a residual strength rate (%). As shown in Table 16, it was confirmed that the strengths were not maintained as the aluminum used as the bonding materials dissolved in sodium hydroxide.

TABLE 16

Referential Example B-2 - Evaluation Results of Chemical Resistance of Bonded Bodies (Bonding Material: Aluminum)

| Ref. Ex. B-2 | Bonding material | | | Heat treatment conditions | | | Transverse rupture strength before test, P1 (MPa) | Transverse rupture strength after test, P2 (MPa) | Residual strength rate (P1 − P2)/P1 (%) |
|---|---|---|---|---|---|---|---|---|---|
| | Kind | Thickness (μm) | Holding conditions | Temp. (° C.) | Time (hr) | Atmosphere | | | |
| B-2-1 | Al foil | 10 | Clamped | 800 | 2 | Vacuum | 306 | 30 | 10 |
| B-2-2 | Al foil | 10 | Clamped | 1,000 | 2 | Vacuum | 385 | 65 | 17 |

Evaluation of Chemical Resistance of Bonded Bodies According to Second Embodiment

Example B-7

Provided were bonded bodies (which were centrally provided with bonded parts, respectively) of 3 mm×4 mm×40 mm in the form of the bend test specimen, which had been bonded under the below-described conditions, respectively, by using copper foils of 10 μm thickness as bonding materials, and the bonded bodies were examined at bonded parts thereof for chemical resistance in a similar manner as in Referential Example B-2. The evaluation results are shown in Table 17. As shown in Table 17, it was confirmed that no substantial reductions were observed in strength and the bond strengths were maintained and that the bonded bodies exhibited high chemical resistance.

TABLE 17

Example B-7 - Evaluation Results of Chemical Resistance of Bonded Bodies (Bonding Material: Copper)

| Example B-7 | Bonding material | | | Heat treatment conditions | | | Transverse rupture strength before test, P1 (MPa) | Transverse rupture strength after test, P2 (MPa) | Residual strength rate (P1 − P2)/P1 (%) |
|---|---|---|---|---|---|---|---|---|---|
| | Kind | Thickness (μm) | Holding conditions | Temp. (°C.) | Time (hr) | Atmosphere | | | |
| B-7-1 | Copper foil | 10 | Clamped | 1,200 | 2 | Vacuum | 105 | 102 | 97 |
| B-7-2 | Copper foil | 10 | Clamped | 1,300 | 2 | Vacuum | 139 | 131 | 94 |
| B-7-3 | Copper foil | 10 | Clamped | 1,400 | 2 | Vacuum | 186 | 175 | 94 |
| B-7-4 | Copper foil | 10 | Clamped | 1,500 | 2 | Vacuum | 211 | 175 | 83 |
| B-7-5 | Copper foil | 10 | Clamped | 1,600 | 2 | Vacuum | 141 | 130 | 92 |

Example B-8

Provided were bonded bodies (which were centrally provided with bonded parts, respectively) of 3 mm×4 mm×40 mm in the form of the bend test specimen, which had been bonded under the below-described conditions, respectively, by using gold foils of 10 μm thickness as bonding materials, and the bonded bodies were examined at bonded parts thereof for chemical resistance in a similar manner as in Referential Example B-2. The evaluation results are shown in Table 18. As shown in Table 18, it was confirmed that no substantial reductions were observed in strength and the bond strengths were maintained and that the bonded bodies exhibited high chemical resistance.

TABLE 18

Example B-8 - Evaluation Results of Chemical Resistance of Bonded Bodies (Bonding Material: Gold)

| Example B-8 | Bonding material | | | Heat treatment conditions | | | Transverse rupture strength before test, P1 (MPa) | Transverse rupture strength after test, P2 (MPa) | Residual strength rate (P1 − P2)/P1 (%) |
|---|---|---|---|---|---|---|---|---|---|
| | Kind | Thickness (μm) | Holding conditions | Temp. (°C.) | Time (hr) | Atmosphere | | | |
| B-8-1 | Gold foil | 10 | Clamped | 1,200 | 2 | Vacuum | 105 | 90 | 86 |
| B-8-2 | Gold foil | 10 | Clamped | 1,300 | 2 | Vacuum | 171 | 165 | 96 |
| B-8-3 | Gold foil | 10 | Clamped | 1,400 | 2 | Vacuum | 164 | 150 | 91 |
| B-8-4 | Gold foil | 10 | Clamped | 1,500 | 2 | Vacuum | 146 | 130 | 89 |
| B-8-5 | Gold foil | 10 | Clamped | 1,600 | 2 | Vacuum | 160 | 140 | 88 |

Example B-9

Provided were bonded bodies (which were centrally provided with bonded parts, respectively) of 3 mm×4 mm×40 mm in the form of the bend test specimen, which had been bonded under the below-described conditions, respectively, by using zirconium foils as bonding materials, and the bonded bodies were examined at bonded parts thereof for chemical resistance in a similar manner as in Referential Example B-2. The evaluation results are shown in Table 19. As shown in Table 19, it was confirmed that no substantial reductions were observed in strength and the bond strengths were maintained and that the bonded bodies exhibited high chemical resistance.

TABLE 19

Example B-9 - Evaluation Results of Chemical Resistance of Bonded Bodies (Bonding Material: Zirconium)

| Example B-9 | Bonding material | | | Heat treatment conditions | | | Transverse rupture strength before test, P1 (MPa) | Transverse rupture strength after test, P2 (MPa) | Residual strength rate (P1 − P2)/P1 (%) |
|---|---|---|---|---|---|---|---|---|---|
| | Kind | Thickness (μm) | Holding conditions | Temp. (° C.) | Time (hr) | Atmosphere | | | |
| B-9-1 | Zr foil | 100 | Clamped | 1,400 | 2 | Vacuum | 102 | 95 | 93 |
| B-9-2 | Zr foil | 100 | Clamped | 1,500 | 2 | Vacuum | 104 | 99 | 95 |

Example B-10

Provided were bonded bodies (which were centrally provided with bonded parts, respectively) of 3 mm×4 mm×40 mm in the form of the bend test specimen, which had been bonded using TiC—Al and TiC—Al—Si as bonding materials, respectively, as in Example B-6-1 or B-6-3, and the bonded bodies were examined at bonded parts thereof for chemical resistance in a similar manner as in Referential Example B-2. The evaluation results are shown in Table 20. As shown in Table 20, the reductions in strength were slight although the bonded bodies were somewhat inferior to the cases of copper, gold and zirconium, and it was able to confirm improvements in chemical resistance over the bonded bodies making use of aluminum alone as a bonding material in Referential Example B-2.

TABLE 20

Example B-10 - Evaluation Results of Chemical Resistance of Bonded Bodies (Bonding Materials: TiC—Al and TiC—Al—Si)

| Example B-10 | Bonding material | | | Heat treatment conditions | | | Transverse rupture strength before test, P1 (MPa) | Transverse rupture strength after test, P2 (MPa) | Residual strength rate (P1 − P2)/P1 (%) |
|---|---|---|---|---|---|---|---|---|---|
| | Kind | Thickness (μm) | Holding conditions | Temp. (° C.) | Time (hr) | Atmosphere | | | |
| 10-1 | TiC—Al | 50 | Clamped | 1,000 | 0.5 | Vacuum | 245 | 198 | 81 |
| 10-2 | TiC—Al—Si | 50 | Clamped | 1,000 | 0.5 | Vacuum | 227 | 199 | 88 |

INDUSTRIAL APPLICABILITY

As an application example of the present invention, in the field of boron carbide-containing ceramics exhibiting extremely good characteristics in hardness and lightweight properties, large bonded bodies can be provided at low price by bonding small members. Further, because the bonded bodies can be provided at bonded parts thereof with improved chemical resistance, an enlargement of the application of boron carbide ceramics as useful industrial members can be promoted in this respect too, thereby making it possible to apply them to various application fields where large boron carbide-containing members have not been used due to low production yield despite their expected application as large members. According to the present invention, large members, which exhibit similar properties as their corresponding pure solid materials in strength or in strength and chemical resistance, can also be provided by combining plural small members. Therefore, the present invention can bring about overall energy saving effects for production processes, and reductions in cost and significant reductions in greenhouse gas emissions can be expected as synergistic effects or the like.

LEGEND

1 Boron carbide-containing ceramic member
2 Aluminum or aluminum compound
3 Aluminum compound

The invention claimed is:

1. A bonded, boron carbide-containing ceramic body comprising:
    ceramic members each comprising boron carbide at 60 mass % or higher; and
    a bonding layer,
    wherein the ceramic members are integrated together via the bonding layer, with a raw material for a bonding material in the bonding layer, comprising:
        (i) at least one metal or alloy selected from the group consisting of aluminum metal, copper metal, gold metal, zirconium metal, and alloys based on copper, gold, or zirconium, or a compound comprising aluminum, or
        (ii) a combination of a titanium compound and one material selected from the group consisting of aluminum metal and an aluminum compound, and
    wherein the bonding material may include a reaction product of the boron carbide forming the ceramic member and the raw material for the bonding material, and
    a bonded part of the ceramic body has a strength in a range of 100 MPa or higher when the strength is measured according to JIS R1601 using a sample having a thickness of 3 mm, a width of 4 mm, and a length of 40 mm prepared from the ceramic body.

2. The bonded, boron carbide-containing ceramic body according to claim 1, wherein the bonding layer has a thickness in a range from 1 to 1,000 μm.

3. A process for producing the bonded, boron carbide-containing ceramic body according to claim 1, comprising:
   interposing the bonding material forming the bonding layer in a form selected from the group consisting of a foil, paste, and a vapor deposition layer, between the ceramic members comprising boron carbide at 60 mass % or more so that the ceramic members are bonded together via the bonding material,
      wherein the raw material for the bonding material comprises a metal or an alloy selected from the group consisting of aluminum, copper, gold, zirconium, and alloys thereof as a base, and
      the bonding layer has a thickness in a range of not greater than 1,000 μm; and
   while holding the ceramic members and the bonding layer as they are resulting from the interposing step, heating both the ceramic members so that at least the parts of the ceramic members to be bonded together are heated at a temperature of 600° C. or higher but 1,600° C. or lower in air, under vacuum conditions, or in an inert atmosphere.

4. A process for producing the bonded, boron carbide-containing ceramic body according to claim 1, comprising:
   applying to parts of the ceramic members comprising boron carbide at 60 mass % or more to be bonded together, the titanium compound in a slurry form or in a paste form so as to form a sheet interposed between the parts of the ceramic members,
      wherein the sheet has a thickness in a range of not greater than 1,000 μm;
   holding the ceramic members in close contact with the sheet being interposed therebetween;
   applying the raw material for the bonding material in the bonding layer comprising a powder of the aluminum metal or a powder of the aluminum compound over the parts of the ceramic members to be bonded together; and
   heating at a temperature of 600° C. or higher but lower than 1,200° C. under vacuum conditions or in an inert atmosphere such that the aluminum metal or the aluminum compound infiltrates into the parts of the ceramic members to be bonded together.

5. A process for producing the bonded, boron carbide-containing ceramic body according to claim 2, comprising:
   interposing the raw material for the bonding material forming the bonding layer in a form selected from the group consisting of a foil, paste, and vapor deposition layer between parts of the ceramic members comprising boron carbide at 60% or more so that the parts of the ceramic members are bonded together,
      wherein the bonding layer comprises as the raw material for the bonding material, a metal selected from the group consisting of aluminum, copper, gold, zirconium, and alloys thereof, as a base, and
      the bonding layer has a thickness in a range of not greater than 1,000 μm; and
   while holding the ceramic members and the bonding layer as they are resulting from the interposing step, heating both the ceramic members so that at least the parts of the ceramic members to be bonded together are heated at a temperature of 600° C. or higher but 1,600° C. or lower in air, under vacuum conditions, or in an inert atmosphere.

6. A process for producing the bonded, boron carbide-containing ceramic body according to claim 2, comprising:
   applying to parts of the ceramic members comprising boron carbide at 60 mass % or more to be bonded together, a titanium compound in a slurry form or paste form so as to form a sheet interposed between the parts of the ceramic members,
      wherein the sheet has a thickness in a range of not greater than 1,000 μm;
   holding the ceramic members in close contact with the sheet being interposed therebetween;
   applying the raw material for the bonding material in the bonding layer comprising a powder of the aluminum metal or a powder of the aluminum compound over the parts of the ceramic members to be bonded together; and
   heating at a temperature of 600° C. or higher but lower than 1,200° C. under vacuum conditions or in an inert atmosphere such that the aluminum metal or the aluminum compound infiltrates into the parts of the ceramic members to be bonded together.

7. The bonded, boron carbide-containing ceramic body according to claim 1,
   wherein the raw material for bonding material consists of the aluminum metal or the compound comprising aluminum.

8. The bonded, boron carbide-containing ceramic body according to claim 1,
   wherein the raw material for the bonding material consists of the metal selected from the group consisting of copper, gold, and zirconium.

9. The bonded, boron carbide-containing ceramic body according to claim 1,
   wherein the raw material for the bonding material consists of the combination of the titanium compound and the one material selected from the group consisting of the aluminum metal and the aluminum compound.

10. The bonded, boron carbide-containing ceramic body according to claim 1,
    wherein an amount of aluminum, copper, gold, and zirconium as the metal in the raw material for the bonding material option (i) is 90 mass % or more.

11. The bonded, boron carbide-containing ceramic body according to claim 1,
    wherein the raw material for the bonding material in the bonding layer consists of:
    (i) the at least one metal or alloy selected from the group consisting of the aluminum metal, the copper metal, the gold metal, the zirconium metal, and the alloys based on copper, gold, or zirconium, or the compound comprising aluminum, or
    (ii) the combination of the titanium compound and the one material selected from the group consisting of the aluminum metal and the aluminum compound.

12. The process according to claim 4,
    wherein the raw material for the bonding material in the bonding layer consists of the powder of the aluminum metal or the powder of the aluminum compound.

13. The process according to claim 5,
    wherein the raw material for the bonding material in the bonding layer consists of the metal selected from the group consisting of aluminum, copper, gold, zirconium, and alloys thereof.

14. The process according to claim 6,
    wherein the raw material for the bonding material in the bonding layer consists of the powder of the aluminum metal or a powder of the aluminum compound.

* * * * *